United States Patent
Green

(10) Patent No.: US 9,738,154 B2
(45) Date of Patent: Aug. 22, 2017

(54) VEHICLE MOUNTING ASSEMBLY FOR A FUEL SUPPLY

(71) Applicant: Jason E. Green, Miami, FL (US)

(72) Inventor: Jason E. Green, Miami, FL (US)

(73) Assignee: Gaseous Fuel Systems, Corp., Weston, FL (US)

(*) Notice: Subject to any disclaimer, the term of this patent is extended or adjusted under 35 U.S.C. 154(b) by 0 days.

(21) Appl. No.: 15/064,048

(22) Filed: Mar. 8, 2016

(65) Prior Publication Data

US 2016/0257196 A1    Sep. 8, 2016

Related U.S. Application Data

(63) Continuation-in-part of application No. 14/538,230, filed on Nov. 11, 2014, now Pat. No. 9,278,614,
(Continued)

(51) Int. Cl.
- *B60K 15/07* (2006.01)
- *B60K 15/03* (2006.01)

(52) U.S. Cl.
CPC .... *B60K 15/07* (2013.01); *B60K 2015/03157* (2013.01); *B60K 2015/03309* (2013.01);
(Continued)

(58) Field of Classification Search
CPC .......... B60K 15/07; B60K 2015/03309; B60Y 2200/411
(Continued)

(56) References Cited

U.S. PATENT DOCUMENTS 2,058,309 A   10/1936 Haering 2,831,754 A   4/1958 Manka
(Continued)

FOREIGN PATENT DOCUMENTS

CA         2741263      10/2014
WO     WO 02/101214    12/2002
(Continued)

OTHER PUBLICATIONS

GFS Corp., First LNG Mining Truck in U.S. [online press release]. Oct. 21, 2010. Retrieved from the internet on Oct. 25, 2012: http://www.d2ginc.com/PDF/First%20LNG%20Mining%20Truck%20In%20US%20Press%20Kit%20Oct%2021.pdf.
(Continued)

*Primary Examiner* — Robert J Hicks
*Assistant Examiner* — Kareen Thomas
(74) *Attorney, Agent, or Firm* — Malloy & Malloy, P.L.

(57) ABSTRACT

A mounting assembly for supporting a fuel supply on a vehicle, which is specifically adapted for the operable support and positioning of an auxiliary fuel supply. The vehicle with which the mounting assembly is utilized may vary significantly, but is primarily structured for use on mine haul vehicles, bulldozers, and other heavy duty commercial vehicles, wherein the operation thereof is significantly benefited or enhanced through the provision of an auxiliary, or alternate fuel supply such as, but not limited to, liquid natural gas (LNG), selectively powering the engine of the vehicle as determined by an improved electronic control system. The mounting assembly comprises a containment structure in the form of at least one fuel tank and a housing is structured to enclose the fuel tank. A base supports the housing and provides a pivot point about which the housing may be disposed between a first and second orientation.

14 Claims, 17 Drawing Sheets

Related U.S. Application Data which is a continuation-in-part of application No. 13/274,625, filed on Oct. 17, 2011, now Pat. No. 8,881,933.

(52) U.S. Cl.
CPC ... *B60Y 2200/142* (2013.01); *B60Y 2200/411* (2013.01); *Y10T 137/6881* (2015.04)

(58) Field of Classification Search
USPC ....... 220/628, 636, 635, 694, 605, 629, 562; 248/151, 164, 431, 168, 170, 163.1, 439, 248/173, 220.21; 123/575, 434
See application file for complete search history.

(56) References Cited

U.S. PATENT DOCUMENTS

| | | | |
|---|---|---|---|
| 3,671,025 A | 6/1972 | Elliott | |
| 3,675,901 A | 7/1972 | Rion | |
| 3,761,065 A | 9/1973 | Rich et al. | |
| 3,866,781 A | 2/1975 | Stedman et al. | |
| 4,006,852 A | 2/1977 | Pilsner et al. | |
| 4,078,629 A | 3/1978 | Kutay et al. | |
| 4,234,922 A | 11/1980 | Wilde et al. | |
| 4,270,576 A | 6/1981 | Takeda et al. | |
| 4,288,086 A | 9/1981 | Oban et al. | |
| 4,335,697 A | 6/1982 | McLean | |
| 4,415,051 A | 11/1983 | Taylor | |
| 4,442,665 A | 4/1984 | Fick et al. | |
| 4,444,373 A * | 4/1984 | Hayashi | B60K 15/067 248/544 |
| 4,489,699 A | 12/1984 | Poehlman | |
| 4,499,885 A | 2/1985 | Weissenbach | |
| 4,522,159 A | 6/1985 | Engel et al. | |
| 4,527,516 A | 7/1985 | Foster | |
| 4,535,728 A | 8/1985 | Batchelor | |
| 4,564,298 A | 1/1986 | Gritters et al. | |
| 4,597,364 A | 7/1986 | Young | |
| 4,603,674 A | 8/1986 | Tanaka | |
| 4,606,322 A | 8/1986 | Reid et al. | |
| 4,616,937 A | 10/1986 | King | |
| 4,617,904 A | 10/1986 | Pagdin | |
| 4,633,909 A | 1/1987 | Louboutin et al. | |
| 4,641,625 A | 2/1987 | Smith | |
| 4,708,094 A | 11/1987 | Helmich et al. | |
| 4,753,535 A | 6/1988 | King | |
| 4,770,428 A | 9/1988 | Sugiyama | |
| 4,799,565 A | 1/1989 | Handa et al. | |
| 4,817,568 A | 4/1989 | Bedford | |
| 4,861,096 A | 8/1989 | Hastings | |
| 4,955,326 A | 9/1990 | Helmich | |
| 5,033,567 A | 7/1991 | Washburn et al. | |
| 5,050,550 A | 9/1991 | Gao | |
| 5,054,799 A | 10/1991 | Fingerle | |
| 5,081,969 A | 1/1992 | Long, III | |
| 5,092,305 A | 3/1992 | King | |
| 5,156,230 A | 10/1992 | Washburn | |
| 5,176,448 A | 1/1993 | King et al. | |
| 5,215,157 A | 6/1993 | Teich | |
| 5,224,457 A | 7/1993 | Arsenault et al. | |
| 5,355,854 A | 10/1994 | Aubee | |
| 5,356,213 A | 10/1994 | Arpentinier | |
| 5,370,097 A | 12/1994 | Davis | |
| 5,375,582 A | 12/1994 | Wimer | |
| 5,379,740 A | 1/1995 | Moore et al. | |
| 5,404,711 A | 4/1995 | Rajput | |
| 5,518,272 A | 5/1996 | Fukagawa et al. | |
| 5,526,786 A | 6/1996 | Beck et al. | |
| 5,546,908 A | 8/1996 | Stokes | |
| 5,566,653 A | 10/1996 | Feuling | |
| 5,566,712 A | 10/1996 | White et al. | |
| 5,593,167 A | 1/1997 | Barnhardt et al. | |
| 5,598,825 A | 2/1997 | Neumann | |
| 5,609,037 A | 3/1997 | Fischler | |
| D384,341 S | 9/1997 | Hoffman et al. | |
| 5,701,928 A | 12/1997 | Aoki | |
| 5,735,253 A | 4/1998 | Perotto et al. | |
| 5,755,210 A | 5/1998 | Sato et al. | |
| 5,794,979 A | 8/1998 | Kasuga et al. | |
| 5,806,490 A | 9/1998 | Nogi | |
| 5,810,309 A | 9/1998 | Augustine et al. | |
| 5,845,940 A | 12/1998 | Colburn | |
| 5,937,800 A | 8/1999 | Brown | |
| 5,996,207 A | 12/1999 | Brown | |
| 6,003,478 A | 12/1999 | Huber | |
| 6,027,241 A | 2/2000 | King | |
| 6,041,762 A | 3/2000 | Sirosh et al. | |
| 6,101,986 A | 8/2000 | Brown | |
| 6,151,547 A | 11/2000 | Kumar et al. | |
| 6,168,229 B1 | 1/2001 | Kooi et al. | |
| 6,200,014 B1 | 3/2001 | Babenko | |
| 6,250,260 B1 | 6/2001 | Green | |
| 6,250,723 B1 | 6/2001 | Barberis et al. | |
| 6,276,823 B1 | 8/2001 | King | |
| 6,289,881 B1 | 9/2001 | Klopp | |
| D452,693 S | 1/2002 | Mitchell | |
| 6,422,735 B1 | 7/2002 | Lang | |
| 6,513,485 B2 | 2/2003 | Ogawa et al. | |
| 6,543,395 B2 | 4/2003 | Green | |
| 6,550,811 B1 | 4/2003 | Bennett et al. | |
| 6,659,636 B1 | 12/2003 | Matula | |
| 6,676,163 B2 | 1/2004 | Joitescu et al. | |
| 6,718,952 B2 | 4/2004 | Finch | |
| 6,751,835 B2 | 6/2004 | Fenton | |
| 6,766,231 B2 | 7/2004 | Nakagawa et al. | |
| D496,940 S | 10/2004 | Fetterman | |
| 6,863,034 B2 | 3/2005 | Kern et al. | |
| 6,875,258 B2 | 4/2005 | Kuperus | |
| 6,938,928 B2 | 9/2005 | Pfohl et al. | |
| 7,019,626 B1 | 3/2006 | Funk | |
| D525,550 S | 7/2006 | Egidio | |
| D549,721 S | 8/2007 | Ito et al. | |
| 7,270,209 B2 | 9/2007 | Suess | |
| D552,121 S | 10/2007 | Carl et al. | |
| D555,164 S | 11/2007 | Sergio | |
| 7,299,122 B2 | 11/2007 | Perkins | |
| 7,334,818 B2 | 2/2008 | Mascarenhas et al. | |
| 7,341,164 B2 | 3/2008 | Barquist | |
| 7,410,152 B2 | 8/2008 | Yates | |
| 7,441,189 B2 | 10/2008 | Michaels | |
| 7,444,986 B2 | 11/2008 | Shute | |
| 7,607,630 B2 | 10/2009 | Jung et al. | |
| 7,621,565 B2 * | 11/2009 | Ross, Jr. | B60K 15/07 248/240 |
| 7,775,311 B1 | 8/2010 | Hardy et al. | |
| 7,874,451 B2 | 1/2011 | Bel | |
| 7,976,067 B2 | 7/2011 | Naganuma et al. | |
| 7,979,522 B2 | 7/2011 | Lunsford | |
| 8,005,603 B2 | 8/2011 | Fisher et al. | |
| 8,125,346 B2 | 2/2012 | Ballard et al. | |
| 8,282,132 B2 | 10/2012 | Griesbaum | |
| 8,408,600 B2 * | 4/2013 | Kondo | B60K 15/07 280/834 |
| D681,670 S | 5/2013 | Fletcher et al. | |
| D686,244 S | 7/2013 | Moriya et al. | |
| 8,498,799 B2 | 7/2013 | Matthews, Jr. et al. | |
| 8,534,403 B2 | 9/2013 | Pursifull | |
| 8,550,274 B2 | 10/2013 | Gerding | |
| 8,556,107 B2 | 10/2013 | Mcrobbie et al. | |
| 8,820,289 B2 | 9/2014 | Green | |
| 8,881,933 B2 | 11/2014 | Green | |
| 8,882,071 B2 | 11/2014 | Green | |
| 9,004,744 B1 | 4/2015 | Kemp | |
| 9,031,763 B2 | 5/2015 | Green | |
| D733,176 S | 6/2015 | Lin | |
| 9,394,841 B1 | 7/2016 | Green | |
| 2001/0037549 A1 | 11/2001 | Fenton | |
| 2002/0017088 A1 | 2/2002 | Dillon | |
| 2002/0029770 A1 | 3/2002 | Heffel et al. | |
| 2002/0030397 A1 | 3/2002 | Tamura et al. | |
| 2002/0078918 A1 | 6/2002 | Ancimer et al. | |
| 2003/0178422 A1 | 9/2003 | Kosuge et al. | |
| 2003/0187565 A1 | 10/2003 | Wong | |

(56) References Cited

U.S. PATENT DOCUMENTS

| | | |
|---|---|---|
| 2004/0011050 A1 | 1/2004 | Inoue |
| 2004/0140412 A1 | 7/2004 | Hendzel et al. |
| 2004/0148086 A1 | 7/2004 | Tafazoli et al. |
| 2005/0121005 A1 | 6/2005 | Edwards |
| 2005/0230579 A1 | 10/2005 | Mascarenhas et al. |
| 2006/0032532 A1* | 2/2006 | Suess ............... B60K 15/03006 137/266 |
| 2006/0033322 A1 | 2/2006 | Suess |
| 2006/0158961 A1 | 7/2006 | Ruscheweyh et al. |
| 2006/0161315 A1 | 7/2006 | Lewis |
| 2006/0245296 A1 | 11/2006 | Nishioka et al. |
| 2007/0277530 A1 | 12/2007 | Dinu et al. |
| 2008/0023957 A1 | 1/2008 | Diehl |
| 2008/0042028 A1 | 2/2008 | Ross |
| 2008/0163627 A1 | 7/2008 | ELKady et al. |
| 2009/0000842 A1 | 1/2009 | Hwang et al. |
| 2009/0152043 A1 | 6/2009 | Lee |
| 2009/0320786 A1 | 12/2009 | Fisher |
| 2010/0045017 A1 | 2/2010 | Rea |
| 2010/0051567 A1 | 3/2010 | Ross |
| 2010/0078244 A1 | 4/2010 | Pursifull |
| 2010/0127002 A1 | 5/2010 | Bel |
| 2010/0263382 A1 | 10/2010 | Mancini et al. |
| 2011/0087988 A1 | 4/2011 | Ray et al. |
| 2011/0202256 A1 | 8/2011 | Sauve et al. |
| 2011/0209074 A1 | 8/2011 | Gill et al. |
| 2012/0001743 A1 | 1/2012 | Cotten et al. |
| 2012/0060800 A1 | 3/2012 | Green |
| 2012/0067660 A1 | 3/2012 | Kashu et al. |
| 2012/0112533 A1 | 5/2012 | Yarmak et al. |
| 2012/0253641 A1 | 10/2012 | Warner et al. |
| 2012/0296552 A1 | 11/2012 | Matthews, Jr. et al. |
| 2012/0310509 A1 | 12/2012 | Pardo et al. |
| 2012/0325355 A1 | 12/2012 | Docheff |
| 2013/0068905 A1 | 3/2013 | Green |
| 2013/0069357 A1 | 3/2013 | Green |
| 2013/0074816 A1 | 3/2013 | Green |
| 2013/0092694 A1 | 4/2013 | Green |
| 2013/0112768 A1 | 5/2013 | Hagenbuch |
| 2013/0245864 A1 | 9/2013 | Frazier et al. |
| 2013/0284747 A1 | 10/2013 | Rund |
| 2013/0284748 A1 | 10/2013 | Sloan et al. |
| 2013/0336084 A1 | 12/2013 | Janz |
| 2014/0053800 A1 | 2/2014 | Steffen et al. |
| 2014/0053816 A1 | 2/2014 | Czapka et al. |
| 2014/0060946 A1 | 3/2014 | Willi |
| 2014/0196687 A1 | 7/2014 | Coldren et al. |
| 2015/0000643 A1 | 1/2015 | Green |
| 2015/0020770 A1 | 1/2015 | Green |
| 2015/0025774 A1 | 1/2015 | Green |
| 2015/0142491 A1 | 5/2015 | Webb |
| 2016/0131007 A1 | 5/2016 | Kauderer et al. |
| 2017/0036536 A1 | 2/2017 | Green |

FOREIGN PATENT DOCUMENTS

| | | |
|---|---|---|
| WO | WO 2008/037175 | 4/2008 |
| WO | WO 2012/036768 | 3/2012 |
| WO | WO 2013/039708 | 3/2013 |
| WO | WO 2013/048812 | 4/2013 |
| WO | WO 2013/058988 | 4/2013 |
| WO | WO 2014/197594 | 12/2014 |
| WO | WO 2016/057239 | 4/2016 |
| WO | WO 2016/065026 | 4/2016 |
| WO | WO 2016/065109 | 4/2016 |

OTHER PUBLICATIONS

Caterpillar 785C Mining Truck Spec Sheet, 2010.
In-vehicle LPG Bottle with shield dated Oct. 30, 2007 [retrieved from internet on Nov. 25, 2015] https://commons.wikimedia.org/wiki/File:In-vehicle_LPG_bottle_012.JPG.

* cited by examiner

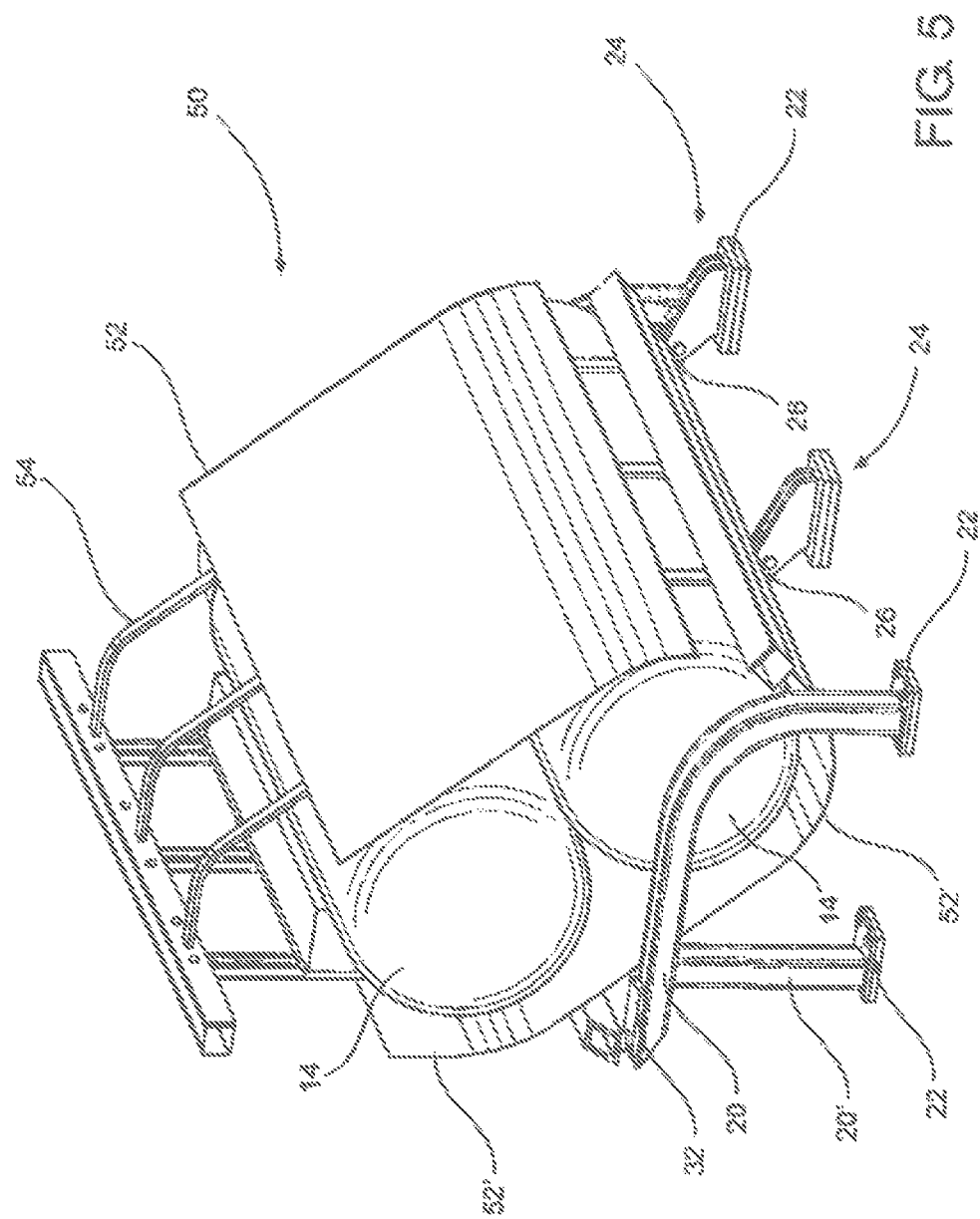

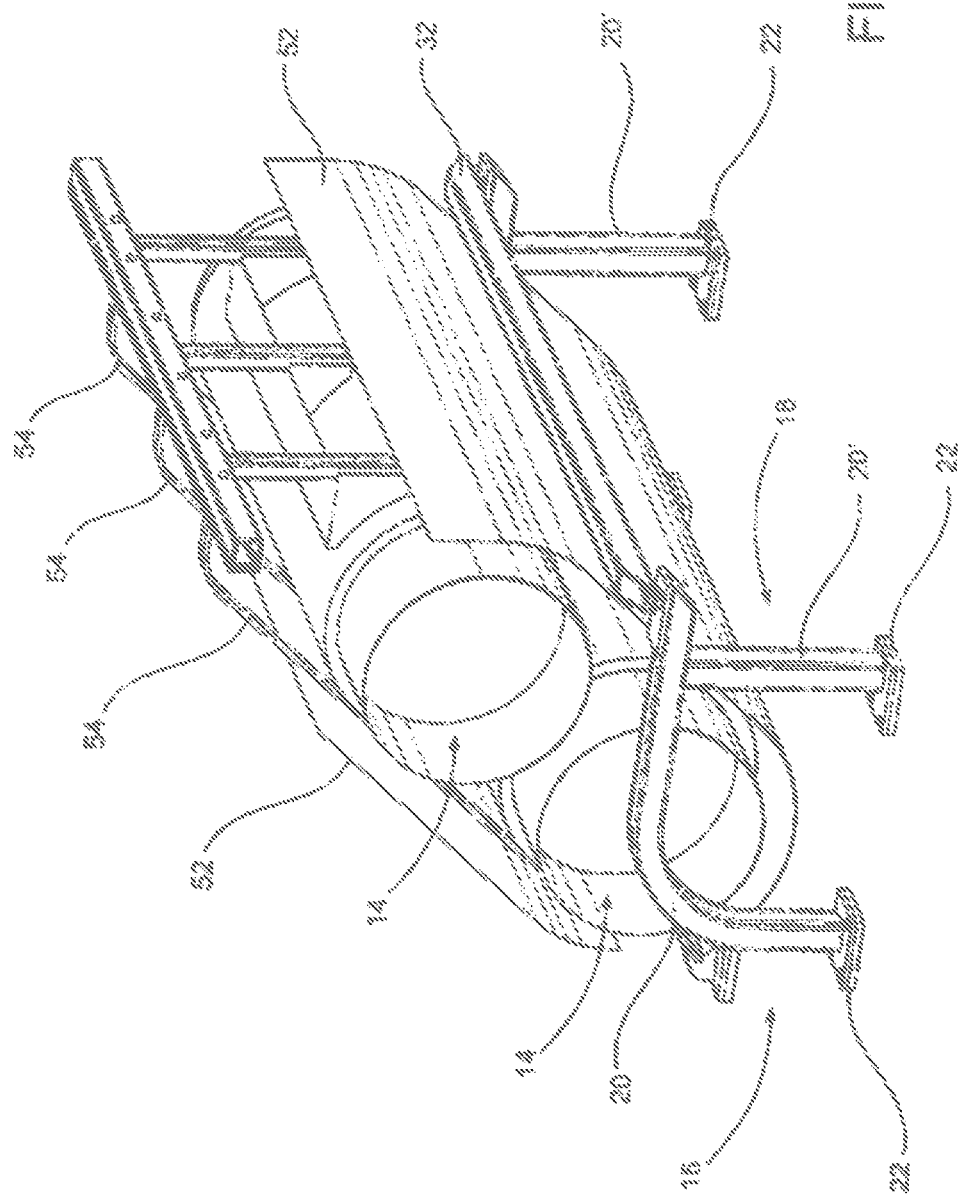

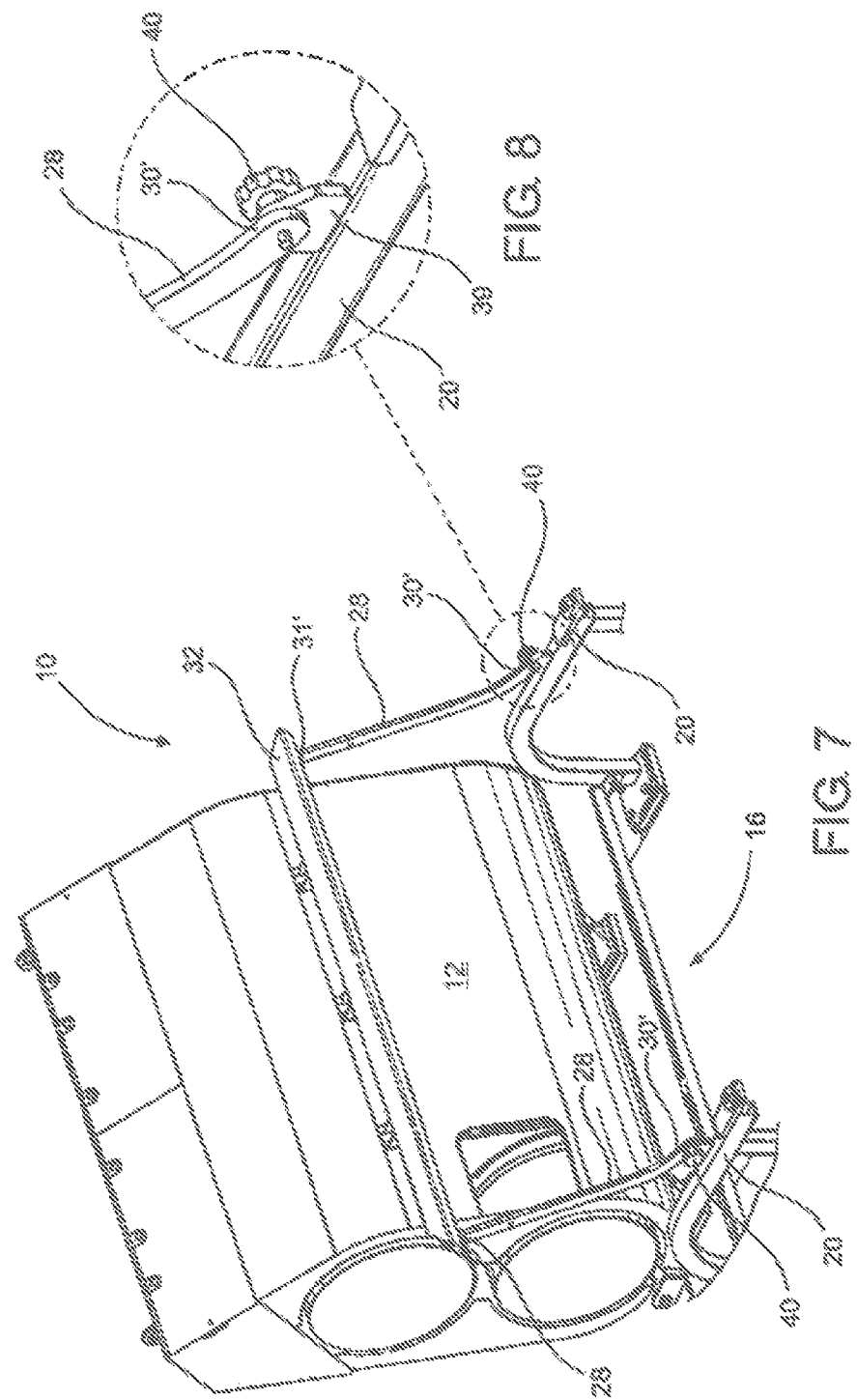

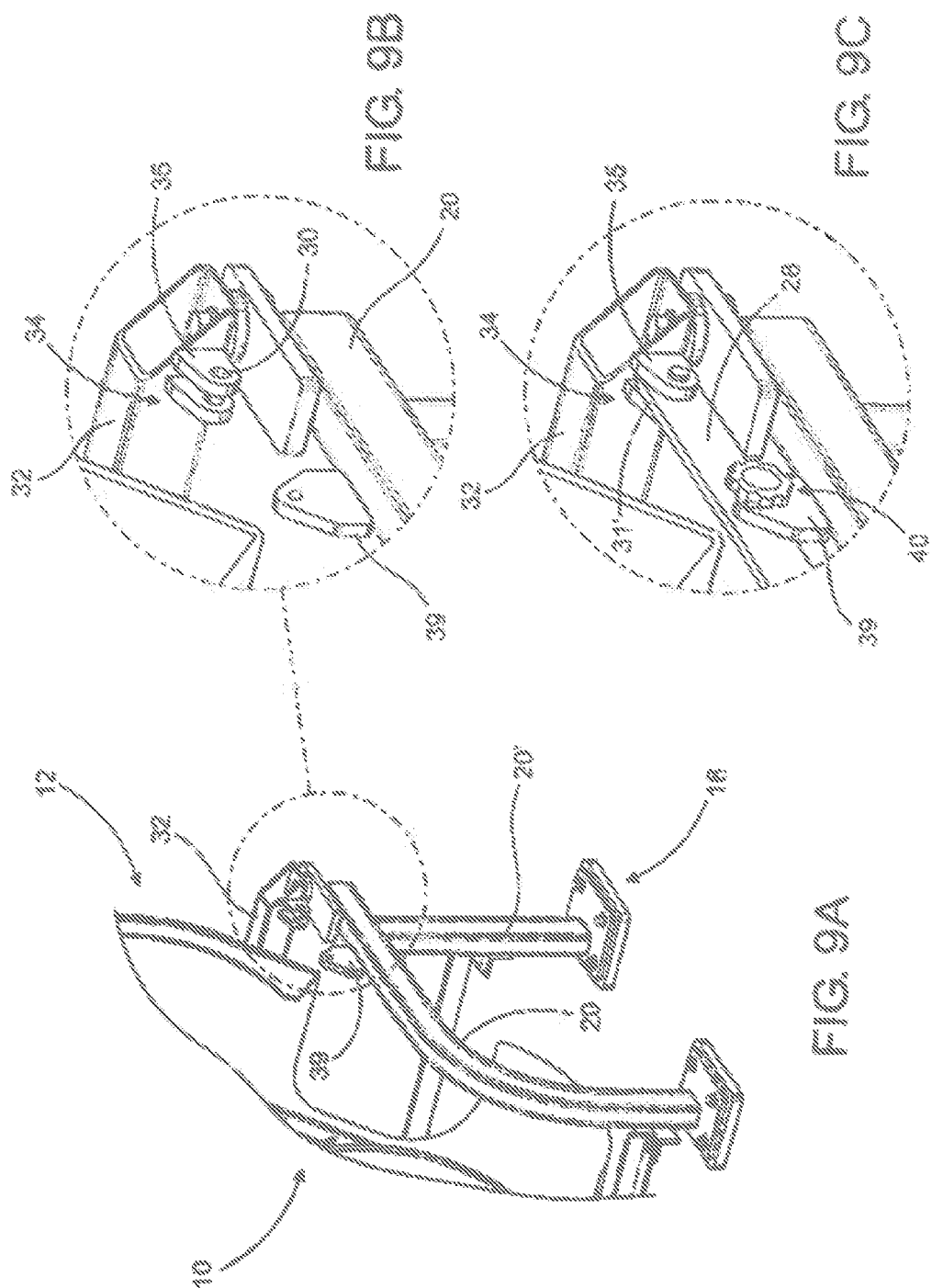

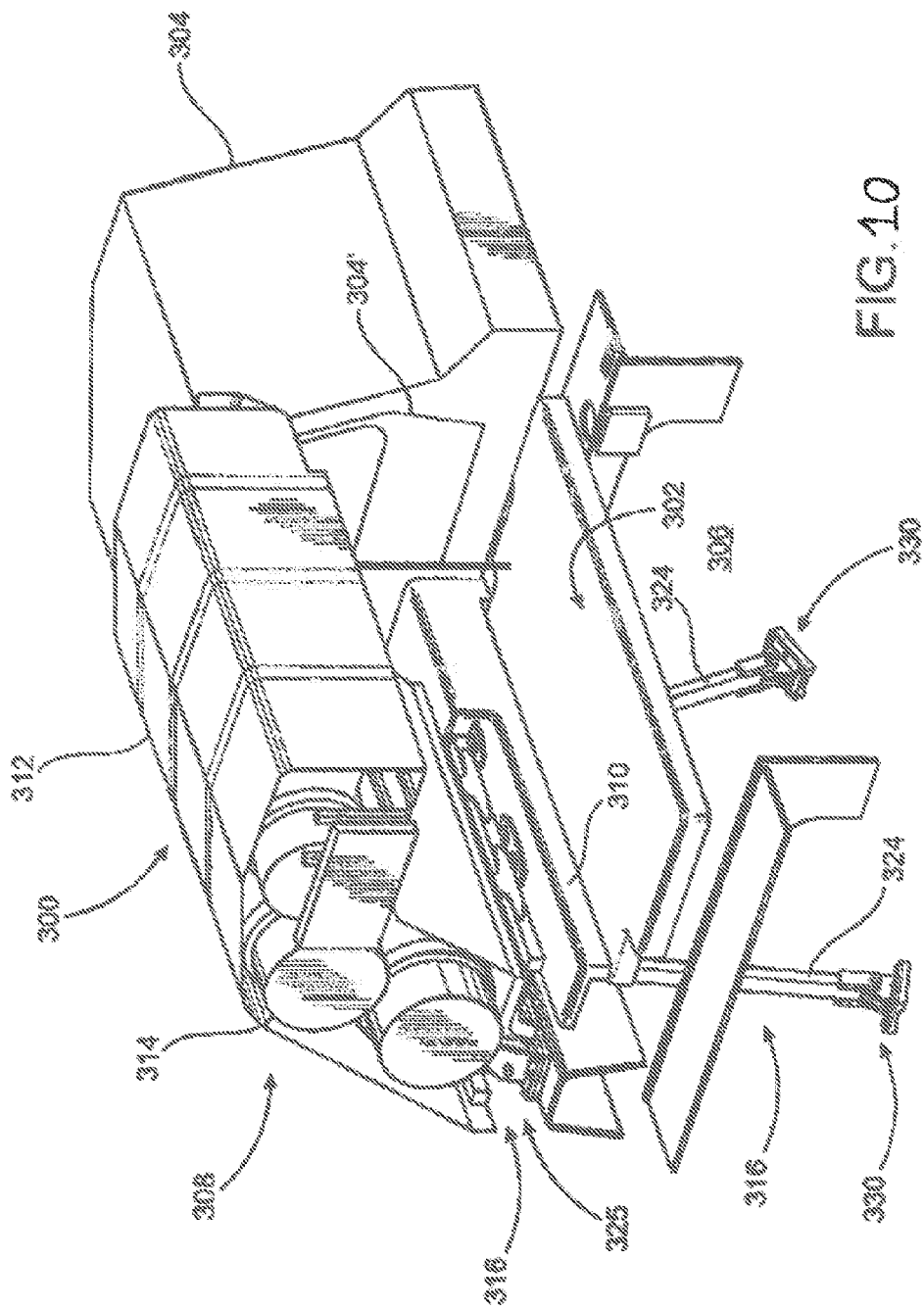

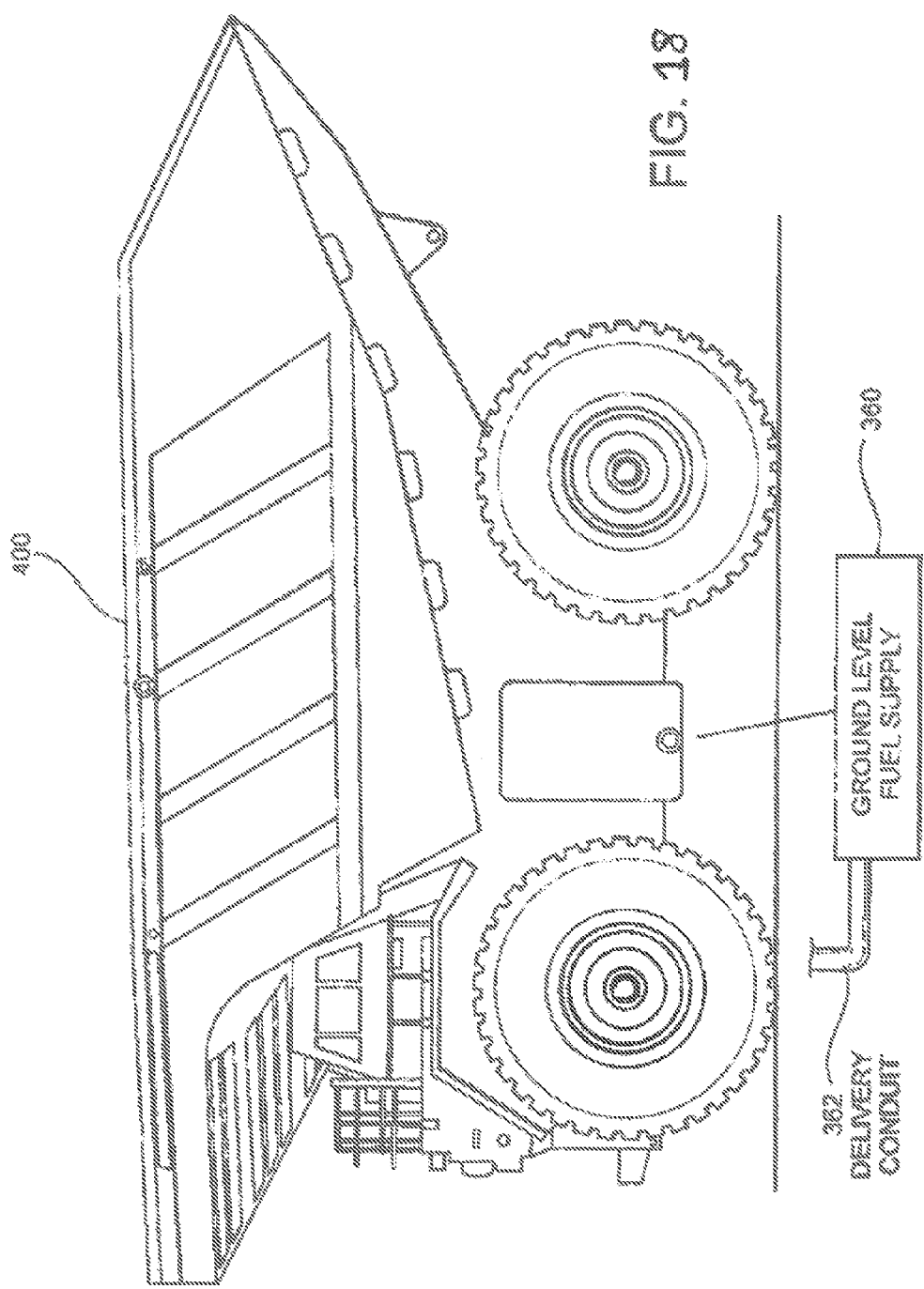

VEHICLE MOUNTING ASSEMBLY FOR A FUEL SUPPLY

CLAIM OF PRIORITY

The present application is a continuation-in-part application of previously filed, application having Ser. No. 14/538,230, filed on Nov. 11, 2014, which matured into U.S. Pat. No. 9,278,614 on Mar. 8, 2016, which claims priority to continuation-in-part patent application having Ser. No. 13/274,625 filed on Oct. 17, 2011, which matured into U.S. Pat. No. 8,881,933 on Nov. 11, 2014 incorporated herein by reference.

BACKGROUND OF THE INVENTION

Field of the Invention

This invention is directed to a mounting assembly for supporting an auxiliary or primary fuel supply on a vehicle such as, but not limited to, mine haul vehicles, bulldozers, and other heavy duty commercial vehicles. As such, the operation of the vehicle with which the mounting assembly is used may be significantly enhanced through the provision of an auxiliary or selectively alternate fuel supply, dependent at least in part on the operating mode and characteristics of the vehicle. Moreover, the alternate fuel may be liquid natural gas (LNG).

Description of the Related Art

Mine haul trucks are off-highway, two axle, rigid dump trucks, specifically engineered for use in high production mining and heavy duty construction environments. As such, mine haul truck capacities typically range from 50 short tons (45 tons) to 400 short tons (363 tons). In addition, the largest and highest payload capacity of such mine haul trucks is referred to as "ultra class" trucks. This ultra class includes mine haul trucks having a payload capacity of at least 300 short tons or greater. Numerous manufacturers throughout the world produce such mammoth vehicles which are engineered for both performance and long operable life. Trucks of this type are developed specifically for high production duty wherein material is transported in large quantities in order to lower transportation costs on a cost-per-ton basis.

Typically mine haul trucks are powered by either direct drive diesel or diesel electric power trains frequently including a multiple horse power turbo charged diesel engine. Due to the exceptional size and weight of such vehicles, they cannot be driven on public access roads, but are ideal for high production environments wherein massive quantities of material must be moved, handled, relocated, etc. on a continuous or regular basis.

Accordingly, it is well recognized that distillate fuels, specifically diesel, are used as the primary fuel source for such vehicles. Attempts to maximize the operational efficiency, while maintaining reasonable safety standards, have previously involved modified throttle control facilities. These attempts serve to diminish adverse effects of control mechanisms which may be potentially harmful to the vehicle engine operation as well as being uneconomical. Typical adverse effects include increased fuel consumption and wear on operative components. Therefore, many diesel engines and the vehicles powered thereby are expected to accommodate various types of high capacity payloads and provide maximum power for relatively significant periods of operation. As a result, many diesel engines associated with heavy duty and off-road vehicles are commonly operated at maximum or near maximum capacity resulting in an attempted maximum power delivery from the vehicle engine and consequent high rates of diesel consumption. It is generally recognized that the provision of a substantially rich fuel mixture in the cylinders of a diesel engine is necessary for providing maximum power when required. Such continued high capacity operation of the vehicle engine results not only in wear on the engine components but also in high fuel consumption rates, lower operating efficiencies, more frequent oil changes and higher costs of operation.

Accordingly, there is a long recognized need for a fuel control system specifically intended for use with high capacity, off-road vehicles including mine haul vehicles of the type generally described above that would allow the use of more efficient fueling methods using other commonly available fuel sources. Therefore, an improved fuel control system is proposed which is determinative of an effective and efficient operative fuel mixture comprised of a combination of gaseous and distillate fuels. More specifically, gaseous fuel can comprise natural gas or other appropriate gaseous type fuels, wherein distillate fuel would typically include diesel fuel.

Such a preferred and proposed fuel control system should be capable of regulating the composition of the operative fuel mixture on which the vehicle engine currently operates to include 100% distillate fuel, when the vehicle's operating mode(s) clearly indicate that the combination of gaseous and distillate fuels is not advantageous. Further, such a proposed fuel control system could have an included secondary function to act as a general safety system serving to monitor critical engine fuel system and chassis parameters. As a result, control facilities associated with such a preferred fuel control system should allow for discrete, user defined control and safety set points for various engine, fuel system and chassis parameters with pre-alarm, alarm and fault modes.

In addition, the operation of such a fuel control system would be facilitated by the inclusion of a preferred mounting assembly for the alternate fuel supply. As such, the included and preferred mounting assembly would be readily adaptive for use on different vehicles while facilitating the secure, safe and efficient distribution of the alternate fuel in the intended manner.

SUMMARY OF THE INVENTION

This invention is directed to mounting assembly operative to support an alternate fuel supply on a vehicle, wherein the fuel supply may be used with an improved fuel control system. The fuel control system comprises technology that allows for the safe and efficient use of a gaseous fuel such as, but not limited to, liquid natural gas (LNG), in combination with a predetermined quantity of conventional distillate fuel, such as diesel fuel. As a result, the composition of an "operative fuel mixture" used to power a vehicle engine will, dependent on the operating modes of the vehicle engine and operating characteristics of the engine during the operating modes; be either a predetermined combination of gaseous fuel and distillate fuel or substantially entirely distillate fuel, absent any contribution of gaseous fuel. At least one preferred embodiment of the present invention is directed to a mounting assembly for supporting a fuel supply on a vehicle. While the mounting assembly is specifically adapted for the operable support and positioning of an auxiliary fuel supply, it is also structurally and operationally capable of mounting and/or supporting a primary fuel supply. In addition, the vehicle with which the mounting assembly of the present invention is utilized may vary significantly, but is primarily structured for use on mine haul vehicles, bulldozers, and other heavy duty commercial vehicles, wherein the operation thereof is significantly benefited or enhanced through the provision of an auxiliary, or alternate fuel supply such as, but not limited to, liquid natural gas (LNG), used in combination with an improved electronic control system.

For purposes of clarity and in order to further demonstrate the versatility of the mounting assembly of the present invention, it may be used on and operatively associated with a plurality of commercial vehicles including, but not limited to, the following: Caterpillar Models: 797, 793, 789, 785, 777, 775, 773 Komtasu Models: HD1500-7, HD785-7, HD605-7, HD465-7, HD405-7, HD325-7

Terex Models: TR100, TR70, TR60, TR45, TR35 Hitachi Models: EH1700-3, EH1100-3

Euclid Models: R260, R220, R190, R170, R150, R130B, R130M, R130, R120E, R100, R90C, R90, R85B, R85, R65C, R65

The mounting assembly of the present invention comprises a containment structure for the fuel supply (LNG) in the form of at least one or a plurality of fuel tanks. Each of the one or more fuel tanks stores the LNG or other fuel on the interior thereof during periods of non-use or operation of the vehicle. The mounting assembly further includes a housing structured to at least partially enclose the one or more fuel tanks on the interior thereof. A base is mounted on the vehicle in supporting relation to both the housing and the containment structure or fuel tanks. Therefore, the containment structure is at least partially enclosed and accordingly protected against unintended impact or contact by other objects, vehicles, etc. in the working environment of the vehicle on which the fuel supply and containment structure are disposed.

A shield assembly is disposed exteriorly of the containment structure or fuel tanks, in at least partially protective, covering relation thereto, and within or as an integrated part of the housing. Further, the shield assembly comprises one or more shield plates protectively disposed on the interior of the housing and exteriorly of the fuel tanks. Moreover, the one or more shield plates are configured to at least partially correspond to the fuel tanks and are structured of a rigid, heavy duty, high impact resistant material. Such material may include steel plate or other appropriate material capable of providing the sufficient protection of the containment assembly. The disposition and configuration of the one or more shield plates at least partially surrounds and encloses the one or more fuel tanks, so as to further facilitate the protection thereof, by eliminating or significantly restricting the possibility of a damaging impact being directed on the containment structure of the fuel supply.

The base including the operative components associated therewith may include a connecting assembly movably interconnected between the frame or other portion of the vehicle and the housing. Due to the operative features of the connecting assembly, the housing may be selectively disposed between a first orientation and a second orientation relative to at least a portion of the base and the vehicle. Accordingly, when the housing is in either the first or second orientation it is still mounted on and supported by the base and may be selectively positioned in the first or second orientations, at least partially dependent on the fuel supply and/or fuel tanks being operatively connected to the engine of the vehicle. The aforementioned connecting assembly comprises at least one but preferably a plurality of hinge structures movably interconnecting the housing to the vehicle and structured to pivotally dispose the housing into and out of said first and second orientations. The connecting assembly, including the one or more hinge structures may be connected directly to the vehicle adjacent to or in otherwise cooperative relation to the base.

Dependent on the practical application of the mounting assembly, the connecting assembly may be considered a part of the base or independent thereof, at least partially due to the relative and cooperative disposition and function of the connecting assembly and base. More specifically, the connecting assembly, along with at least a portion of the remainder of the base, will serve to support the housing, at least when the housing is in the second orientation and at least partially support the housing when it is in either the first or second orientation. As set forth in greater detail hereinafter, the remainder of the base comprises a plurality of support legs collectively disposed in supporting relation to the housing and attached in supported relation on an appropriate portion of the vehicle.

Additional features of the housing include a stabilizing assembly disposed on the interior thereof in confronting relation to the one or more fuel tanks defining the containment structure. As such, the stabilizing assembly comprises at least one but more practically a plurality of stabilizing members disposed in spaced relation to one another and collectively extending along and confronting a length of the containment structure. Moreover, the one or more stabilizing members include a recessed configuration which at least partially corresponds to the exterior dimension and configuration of the fuel tanks. As a result, a confronting relation between the stabilizing members and the fuel tank(s) serve to restrict movement of the fuel tanks within the interior of the housing during travel or operation of the vehicle, whether the housing and fuel tanks are in the aforementioned first or second orientations.

In addition to the above, the mounting assembly of one or more embodiments of the present invention includes a brace disposed in supporting relation to the housing substantially between the housing and the base, at least when the housing is in the first orientation. As such, the brace is connected to the housing and movable therewith as the housing and containment structure of the fuel supply are disposed between the first and second orientations. In cooperation therewith, a retaining assembly may be both movably and removably interconnected between the base and the housing and more specifically serves to at least partially support and interconnect the brace to the base, at least when the housing is in the second orientation. Moreover, the retaining assembly comprises at least one but preferably a plurality of at least two retaining arms which are disposed in interconnecting relation between the brace and the base in a manner which maintains and removably secures the housing in the second orientation relative to the base and vehicle on which the mounting assembly is disposed.

Therefore, the structural and operative features of the mounting assembly of the present invention enable it to be capable of supporting a fuel supply such as, but not limited to, an auxiliary fuel supply including a containment structure therefore on any of a variety of vehicles, such as of the type set forth above. The auxiliary fuel defining the fuel supply may be liquid natural gas (LNG) or other appropriate fuel compositions which may be utilized in combination with a more conventional distillate fuel. Such conventional fuel may include diesel fuel commonly used in extremely large mine haul vehicles, bulldozers or other working class vehicles.

Also, when the mounting assembly is disposed substantially on an exterior or at least partially exposed portion of the vehicle, the vehicle itself may be structurally modified or adapted to appropriately locate the accompanying fuel supply, containment structure, housing, base, etc. Further, when disposed, such as on a vehicle in the form of a bulldozer, the structural modification thereof may be such as to position the housing in a location which at least partially obstructs the view of the operator within the operator's cab or compartment area. In such instances, additional components may be utilized with the mounting assembly such as a camera or like viewing assembly operative to observe and transmit the obstructed view to a display assembly located within the operator's compartment or cab. This type of camera or like viewing assembly may be considered a part of the mounting assembly and/or may be located independently of the housing, base, etc. in a location which best facilitates the observance of the area obstructed from normal viewing by the operator.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 5 is a front perspective view of the embodiment of FIGS. 1-3 wherein the housing is in at least partially assembled form providing interior details of a shield assembly associated with the housing.

FIG. 6 is a side perspective view of the embodiment of FIG. 5 in at least partially assembled form showing additional structural features of the housing and associated shield assembly.

FIG. 7 is a rear perspective view in partial cutaway of the housing, base, and retaining assembly associated with at least one preferred embodiment of the mounting assembly as generally represented in FIGS. 1-6.

FIG. 8 is a detailed view of an indicated portion of the embodiment of FIG. 7.

FIG. 9A is a perspective view in partial cutaway of an at least partially assembled housing of the mounting assembly of the present invention and associated components of the base.

FIG. 9B is a detailed view of the indicated portion of FIG. 9A.

FIG. 9C is a detailed view of the indicated portion of FIG. 9A, wherein cooperative structural components associated with the retaining assembly and base are represented in at least partially assembled form.

FIG. 10 is a perspective view of another preferred embodiment of a mounting assembly cooperatively dimensioned and configured to be disposed within a mine haul vehicle.

FIG. 12A is a perspective detailed view one component of FIG. 12.

FIG. 18 is a side view of a mine haul vehicle of the type Caterpillar Model 793 with which the embodiment of FIGS. 10 through 17 may be used.

Like reference numerals refer to like parts throughout the several views of the drawings.

DETAILED DESCRIPTION OF THE PREFERRED EMBODIMENT

Figure 1:
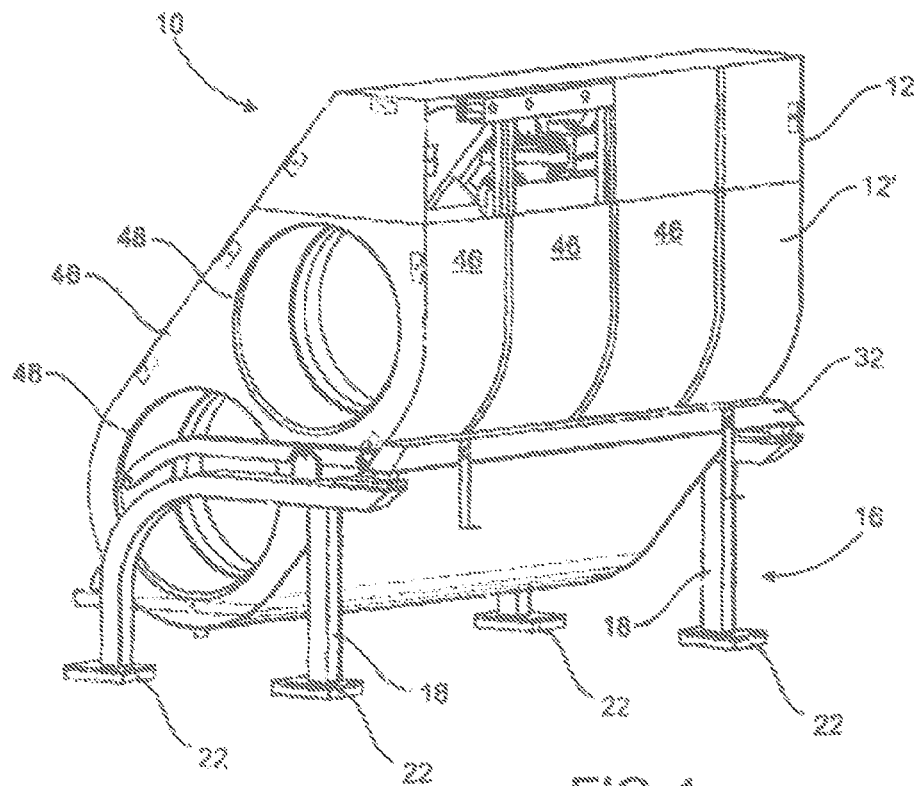
FIG. 1 is a rear perspective view in at least partially schematic form of the mounting assembly of the present invention, wherein the housing thereof is in a first orientation.
Figure 4A:
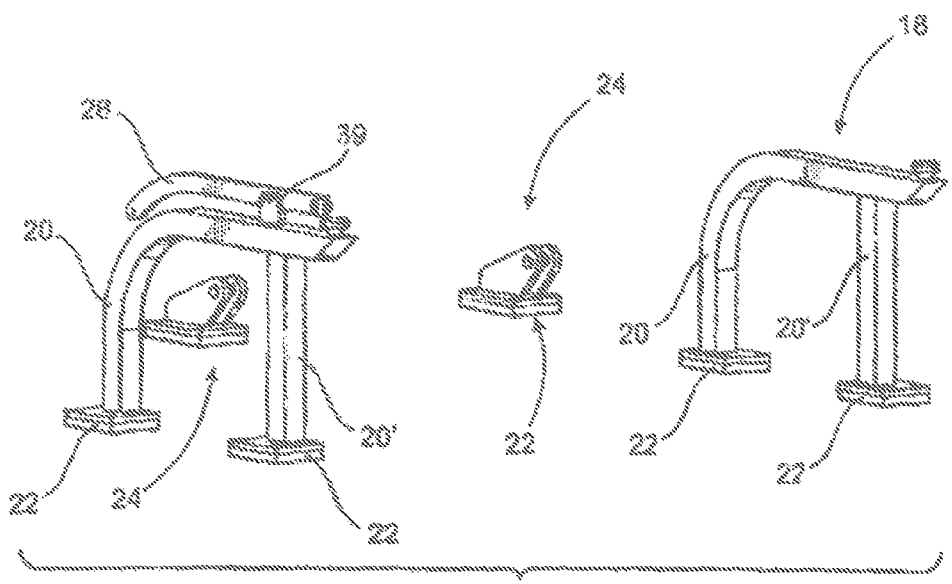
FIG. 4A is a composite view showing various structural components of a base of the embodiment of FIGS. 1-3.

As shown in the accompanying drawings, the present invention is directed to a mounting assembly generally indicated as 10 for supporting and movably interconnecting a housing generally indicated as 12 to a vehicle. The mounting assembly 10 is specifically, but not exclusively, intended for use on heavy duty "mine haul" vehicles, bulldozer or other vehicle especially of the type used in heavy duty commercial and/or working environments. The housing 12 is structured to include a fuel supply disposed within a containment structure, wherein the containment structure comprises at least one but in certain practical applications, a plurality of at least two fuel tanks 14, as represented in at least FIG. 3. However, it is emphasized that more than two fuel tanks can be included in the housing 12 of the mounting assembly 10. As also represented, the housing 12 is supported and interconnected to the vehicle by means of a base assembly, generally indicated as 16. With primary reference to FIGS. 1-4B, the base 16 includes a plurality of support legs 18 each of which include leg segments 20 and 20' having the lower end thereof fixedly secured, such as by welding the accompanying mounting pads 22 to the frame or other appropriate portion of the vehicle, on which the mounting assembly 10 is disposed.

Figure 2:
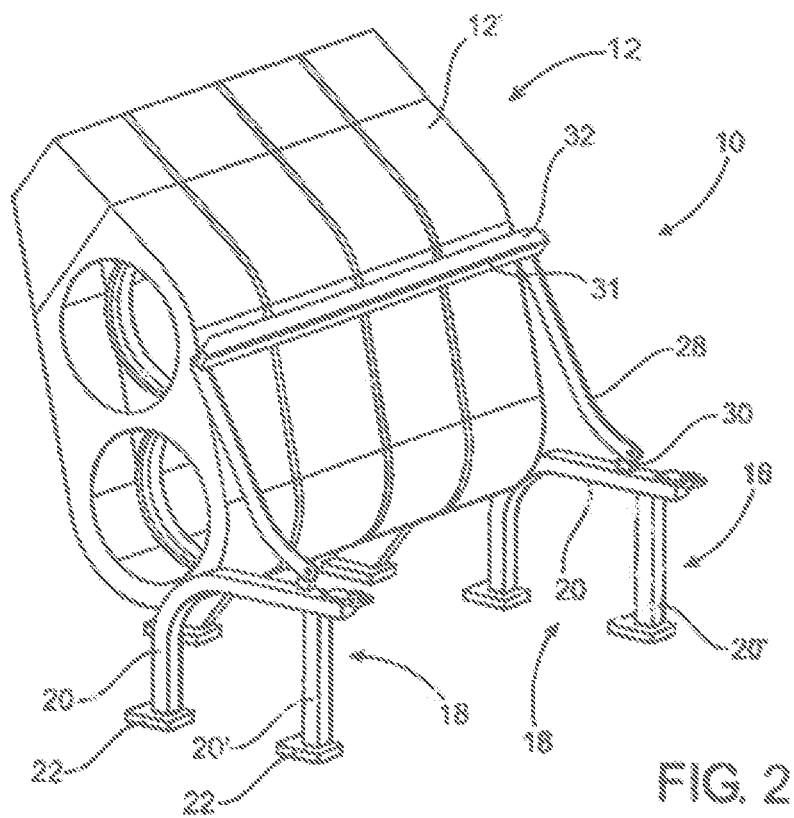
FIG. 2 is a rear perspective view of the embodiment of FIG. 1 wherein the housing is in a second orientation.
Figure 3:
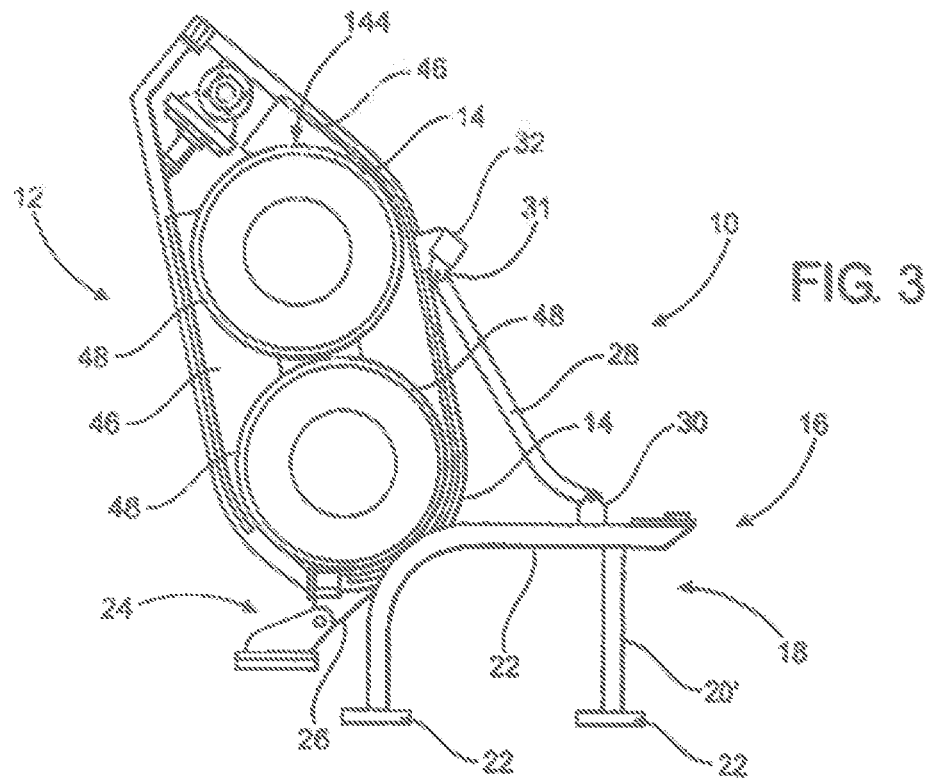
FIG. 3 is a side view of the embodiment of FIG. 2.

The base 16 may also include a connecting assembly comprising at least one but in certain practical applications a plurality of at least two hinge structures generally indicated as 24. Each of the hinge structures 24 are connected to an appropriate link 26 or like structure secured to an under portion of the housing 14 as clearly represented in FIG. 3. The structural and operative features of each of the one or more hinge structures 24 is such as to facilitate the selective positioning or movement of the housing as well as the containment structure or fuel tanks 14 between a first orientation, as represented in FIGS. 1 and 5, and a second substantially upright orientation, as represented in FIGS. 2 and 3. Accordingly, the connecting hinge structures 24 serve to movably interconnect the housing 12 to the vehicle and further serve to support the housing 12 at least when the housing is in the second orientation of FIGS. 2 and 3. The disposition of the hinge structures 24 also add to the support of the housing 12 when it is in the first orientation, as clearly represented in FIGS. 1 and 5. The one or more hinge structures 24 may be considered a part of the base 16 due to their support of the housing 12 when at least in the second orientation and most probably when in both the first and second orientations. However, dependent upon the structure, configuration and dimension of the vehicle on which the mounting assembly 10 is disposed, the one or more hinge structures 24 may be considered independent of the base 16 by virtue of their location being not directly adjacent to or operatively associated with the base 16.

Further with regard to the selective positioning of the housing 12 in either the first or second orientations, the mounting assembly 10 further includes a retaining assembly comprising at least one, but preferably a plurality of at least two retaining arms or bars 28. The one or more retaining arms 28 serve to maintain and at least partially support the housing 12, at least when it is in the second orientation as clearly demonstrated in FIGS. 2 and 3, when the one or more retaining arms 28 are in their operative position. Each of the retaining arms 28 include opposite ends removably connected, as at 30, to the correspondingly disposed support arm 18. The opposite end of each of the retaining arms 28 is removably connected, as at 31, to the housing 12 and more specifically to a brace or cross brace structure 32.

Figure 9:
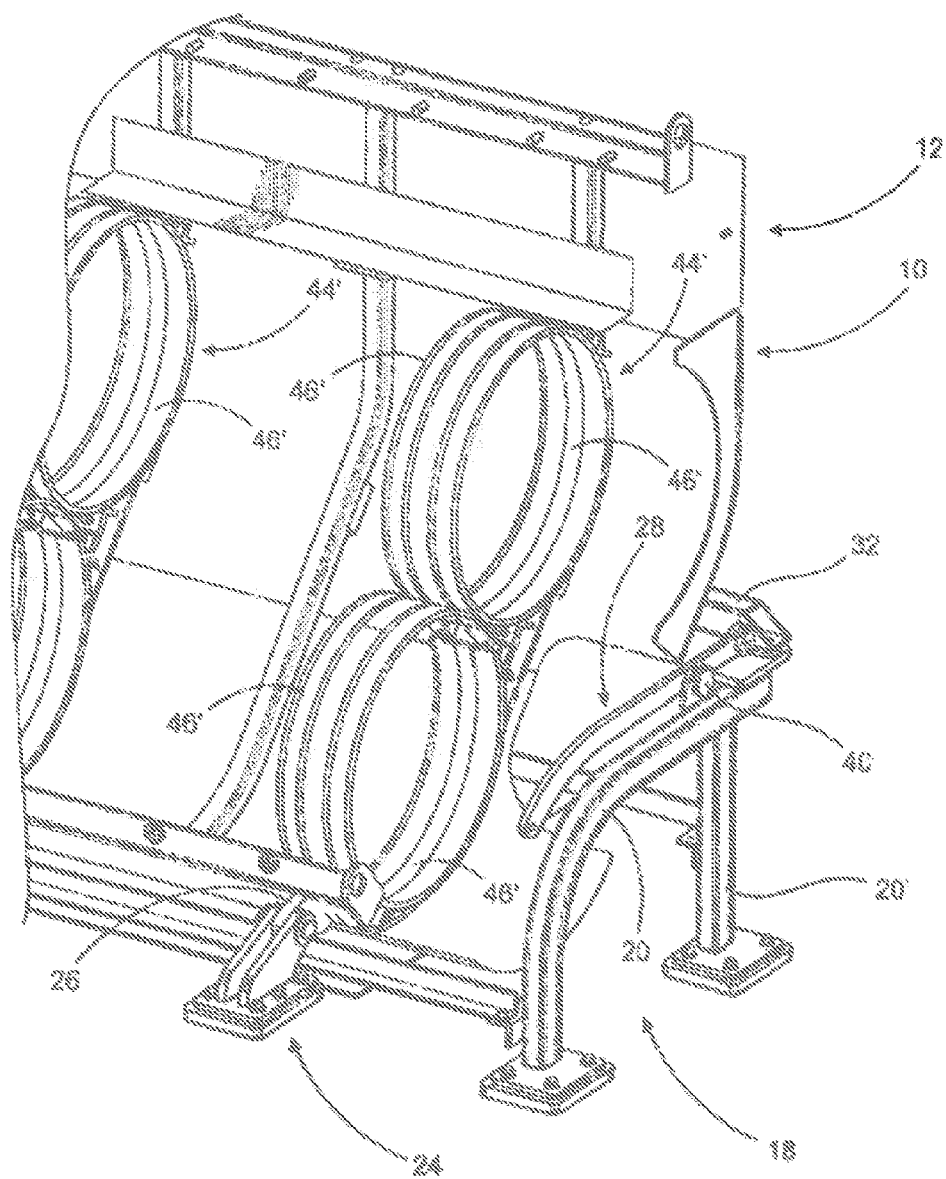
FIG. 9 is a perspective view in partial cutaway and in schematic form of additional structural components associated with the housing, base and structural components associated therewith.
Figure 11:
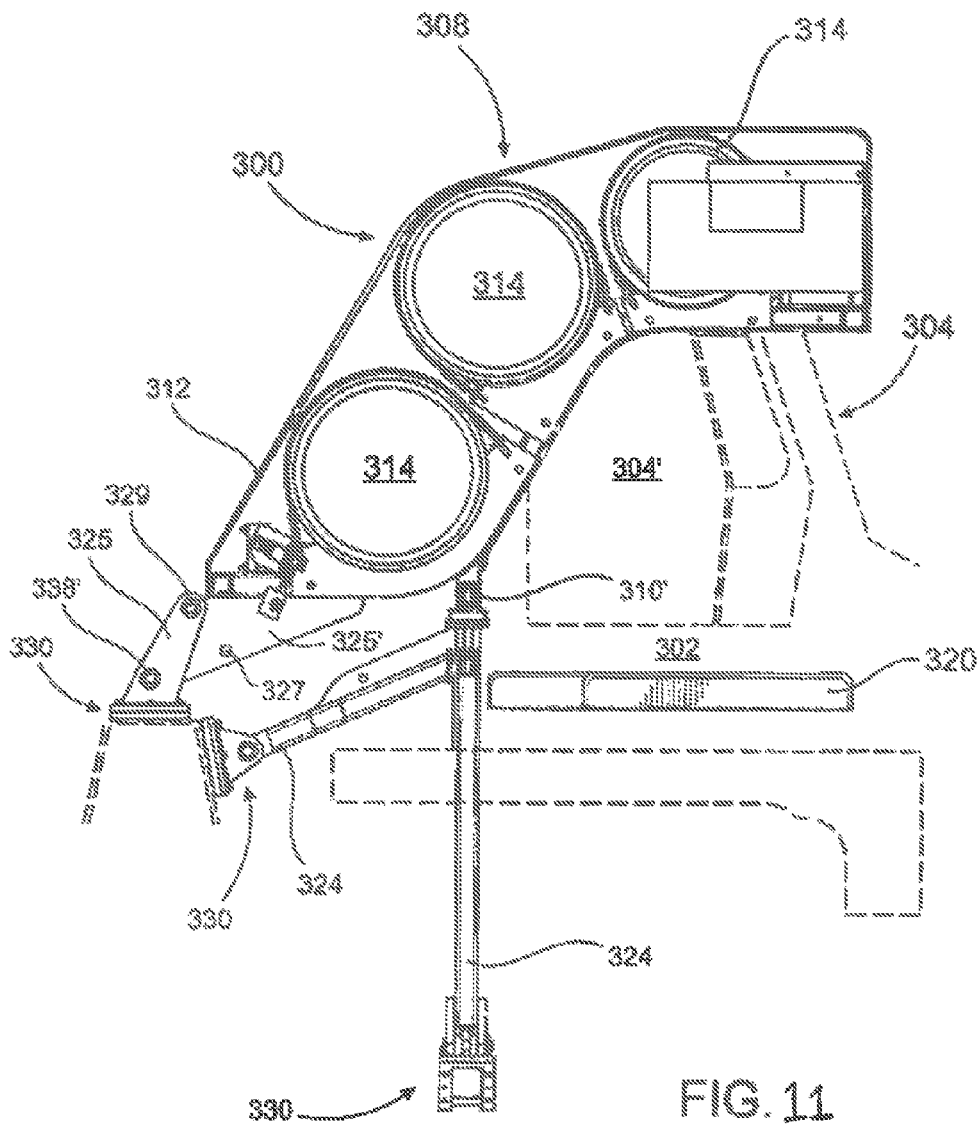
FIG. 11 is a side view in partial phantom of the embodiment of FIG. 10.

With primary reference to FIGS. 9-9C, additional structural and operative features associated with the retaining assembly and specifically including each of the retaining arms 28 are represented. More specifically, when the housing 12 is in the first orientation, the retaining arms 28 are in a stored position or location as demonstrated in FIG. 9. Each of the arms 28 are maintained in such a stored position by being removably locked or secured to corresponding support arms 18 by virtue of an assembly 34, represented in FIGS. 9A-9C. The assembly 34 includes a pair of spaced apart flanges or ears 35 each having apertures 36, disposed in aligned relation with one another. A connecting bolt or like member 37 passes through the aligned apertures 36 in each of the spaced apart ears 35 and also through an apertured end 31' of the corresponding retaining arm 28. As such, each of the retaining arms 28 is maintained in the stored or non-supporting orientation on an upper or top portion of the support leg segment 20. However, when the housing 12 is selectively disposed in the second orientation as represented in FIGS. 2 and 3, the end 31' of each of the retaining arms 28 are removed from the assembly 34 and in turn removably connected to correspondingly disposed portions of the brace 32 as also clearly represented in FIGS. 2 and 3.

Moreover, each of the retaining arms 28 are removed from the stored orientation, as represented in FIG. 9 and disposed in the supporting orientation of FIGS. 2 and 3. When in such a supporting orientation, the opposite end 30 is removably connected to the upstanding connecting flange 39, by a threaded knob 40 or like connector, as clearly represented in FIGS. 7 and 8. The removable but stable interconnection of the opposite ends 30 and 31, as at 30' and 31', to the mounting flange 39 and the base 32, respectively, will serve to assure that the retaining arms 28 are maintained in their operative, supporting, retaining position between the base 16 and the housing 12 and/or brace 32. However, the removable interconnection of each of the retaining arms 28 in their supporting, retaining position facilitates the easy disconnection of the retaining arms 28 for selective disposition in their stored orientation in order to dispose the housing 12 in the first orientation, as described above.

Figure 4B:
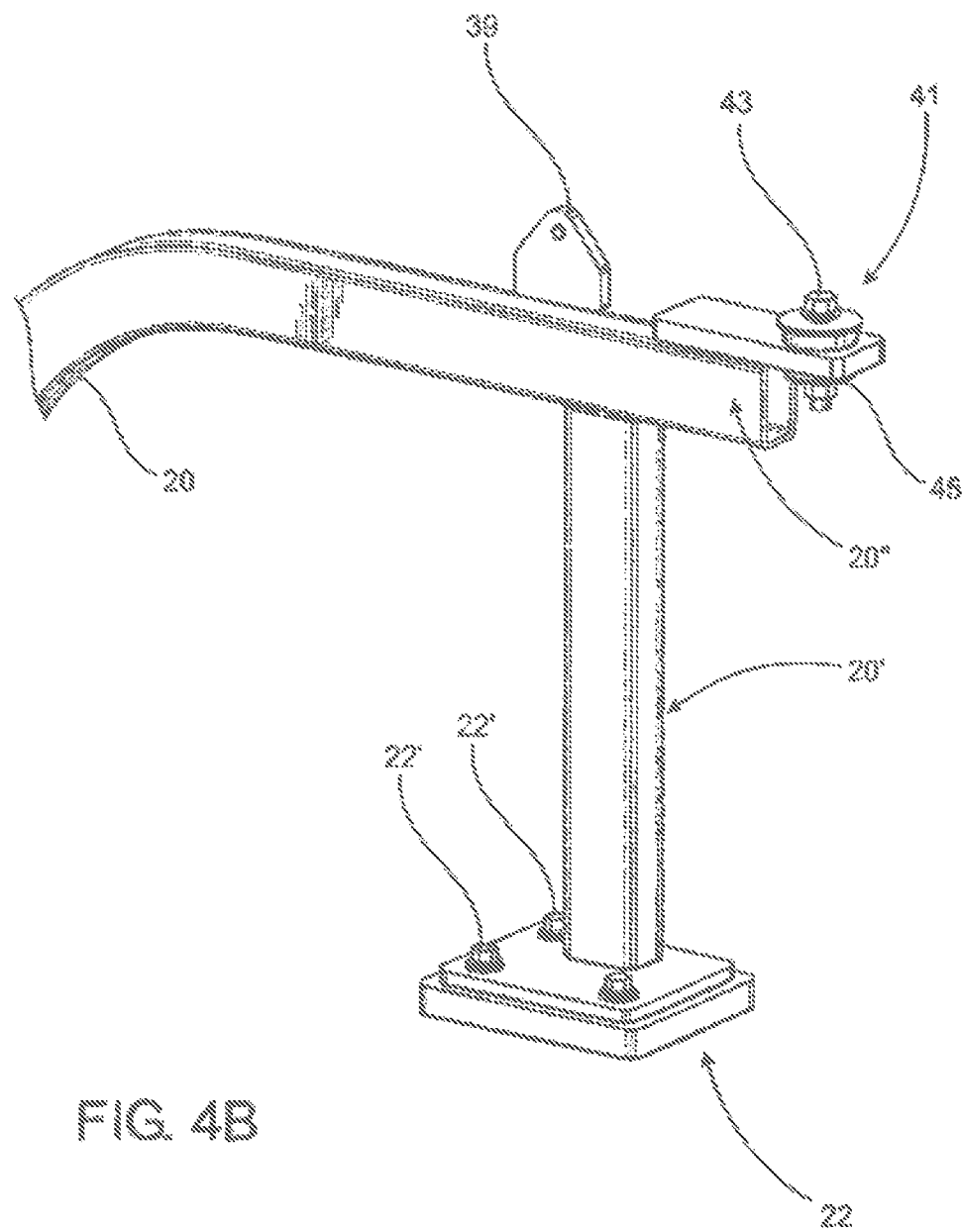
FIG. 4B is a detailed view in partial cutaway of one of a plurality of support legs, as well as structural components associated therewith, at least partially defining the base.

As should be apparent, the stability of the housing 12 as well as the plurality of fuel tanks 14 contained on the interior thereof is important. Accordingly, the maintenance of the housing 12 in the first orientation of FIG. 1 is facilitated by a removable but stable attachment assembly 41 associated with the distal portion of each of the support leg segments 20, as best represented in FIG. 4B. The removable connecting bolt or like connector 43 may include a spring loaded attachment as at 45 and may be further structured to removably interconnect the opposite ends of the brace 32 to the distal ends of the support leg segment 20 as at 20". The spring loaded feature of the attachment assembly 41 will further serve to dampen any abrupt movement and/or vibration being transferred to the housing 12 and to the fuel tanks 14. It is therefore assured that the housing 12 is maintained in the first orientation by virtue of the brace 32 being fixedly connected to the housing 12 and movable therewith as demonstrated in FIGS. 1-3.

The stability of the containment structure, comprising the one or more fuel tanks 14 within the interior of the housing, is further enhanced by a stabilizing assembly 44 also at least partially disposed on the interior of the housing. The stabilizing assembly 44 includes at least one but preferably a plurality of stabilizing members 46 disposed in spaced relation to one another and collectively extending along the length of the one or more fuel tanks 14 defining the containment structure for the fuel supply. In addition, the stabilizing members 46 may be disposed on opposite sides of fuel tanks 14. In addition, each or at least some of the stabilizing members 46 include a recessed segment or portion 48 at least partially dimensioned and configured to the corresponding exterior configuration of each of the fuel tanks 14. As such, the plurality of stabilizing members 46 can be defined as collectively and at least partially surrounding and/or "sandwiching" the plurality of fuel tanks 14 there between. By virtue of this cooperative disposition and structure, movement or inadvertent, unintended displacement of the one or more fuel tanks 14 within the interior of the housing 12 is eliminated or significantly restricted. In addition, the stabilizing assembly 46 can be defined by a plurality of the stabilizing members 48 which may vary in number, size, configuration, etc. so as to accommodate a confronting engagement or relation with the one or more fuel tanks 14 in a manner which facilitates the ability to restrict the displacement or movement of the fuel tanks 14 within the interior of the housing 12, whether the housing 12 is in either the aforementioned first or second orientations.

With reference to FIG. 9, an alternate embodiment of the stabilizing assembly is generally represented as 44'. As there represented, the plurality of stabilizing members 46' are disposed in spaced relation to one another and include a generally annular or circular configuration of sufficient dimension to at least partially surround correspondingly dispose ones of the fuel tanks 14. Further, the stabilizing members 46' may be segregated from one another at opposite ends so as to facilitate the stable positioning of the fuel tanks 14, on the interior of the cooperatively disposed stabilizing segments 46'.

As set forth above, the mounting assembly 10 is structurally and operatively adaptable for the mounting, and support of an auxiliary fuel supply and as such, may be mounted on exterior portions of the vehicle with which it is associated. Accordingly, as represented in FIGS. 5 and 6, the housing 12 further includes a shield assembly generally indicated as 50. Shield assembly 50 includes at least one but more practically a plurality of shielding plates 52, which are formed of a metallic or other rigid, impact resistant material. Further, each of the shield plates 52 are cooperatively disposed and configured to at least partially enclose and/or overlie normally exposed portions of the fuel tanks 14, while they are maintained on the interior of the housing 12. In addition, each of the shield plates 52 is also disposed at least partially on the interior of the housing 12, such as by being associated with or integrated within corresponding side walls 12'. Positioning and further reinforcement of the housing may be accomplished through the provision of a plurality of mounting or supporting ribs 44, which also may be associated with the side walls 12' of the housing 12 so as to maintain the shield plates 52 in their protective position relative to the fuel tanks 14. The corresponding configuration of the shield plates 52 may include curved or partially bent segments thereof as at 52', wherein such curvilinear segments may at least partially correspond to the exterior configuration of the fuel tanks. In addition, the structure, disposition, configuration and size of each of the one or more shield plates 52 is made to cooperate with or correspond to the plurality of stabilizing members 46 and/or 46' in a manner which further facilitates the protection and stable retaining of the fuel tanks 14 within the interior of the housing.

As represented in FIGS. 10 through 18, the present invention comprises an additional preferred embodiment directed to a system for mounting an alternate fuel supply on a mine haul vehicle. In more specific terms, the various operational and structural components of this additional assembly are specifically, but not exclusively, adapted for use on a Caterpillar Model 793 mine haul vehicle.

Therefore, the assembly of this embodiment of the present invention comprises a mounting assembly generally indicated as 300 including a containment area 302 located on the vehicle in laterally adjacent relation to an operator cab 304 and above and in adjacent, at least partially overlying relation to an engine compartment 306 of the mine haul vehicle. Further, the mounting assembly 300 comprises a housing 308 including a frame portion 310 and an overlying, at least partially enclosing canopy 312. Further, the housing 308 is disposed, dimensioned and configured to support at least one, but in certain practical applications, a plurality of fuel tanks 314, each structured for containment of the alternate fuel such as liquid natural gas (LNG). The mounting assembly 300 also includes a base 316 disposed to support and interconnect the housing 308 as well as the one or more fuel tanks 314 of the alternate fuel supply to the vehicle 400. Accordingly, the housing 308 is dimensioned, disposed, and configured in at least partial conformance with the containment area 302 such that mounting assembly 300 as well as the containment area 302 are specifically adapted to conform to the dimensions and configurations of the aforementioned mine haul vehicle 400.

Figure 12:
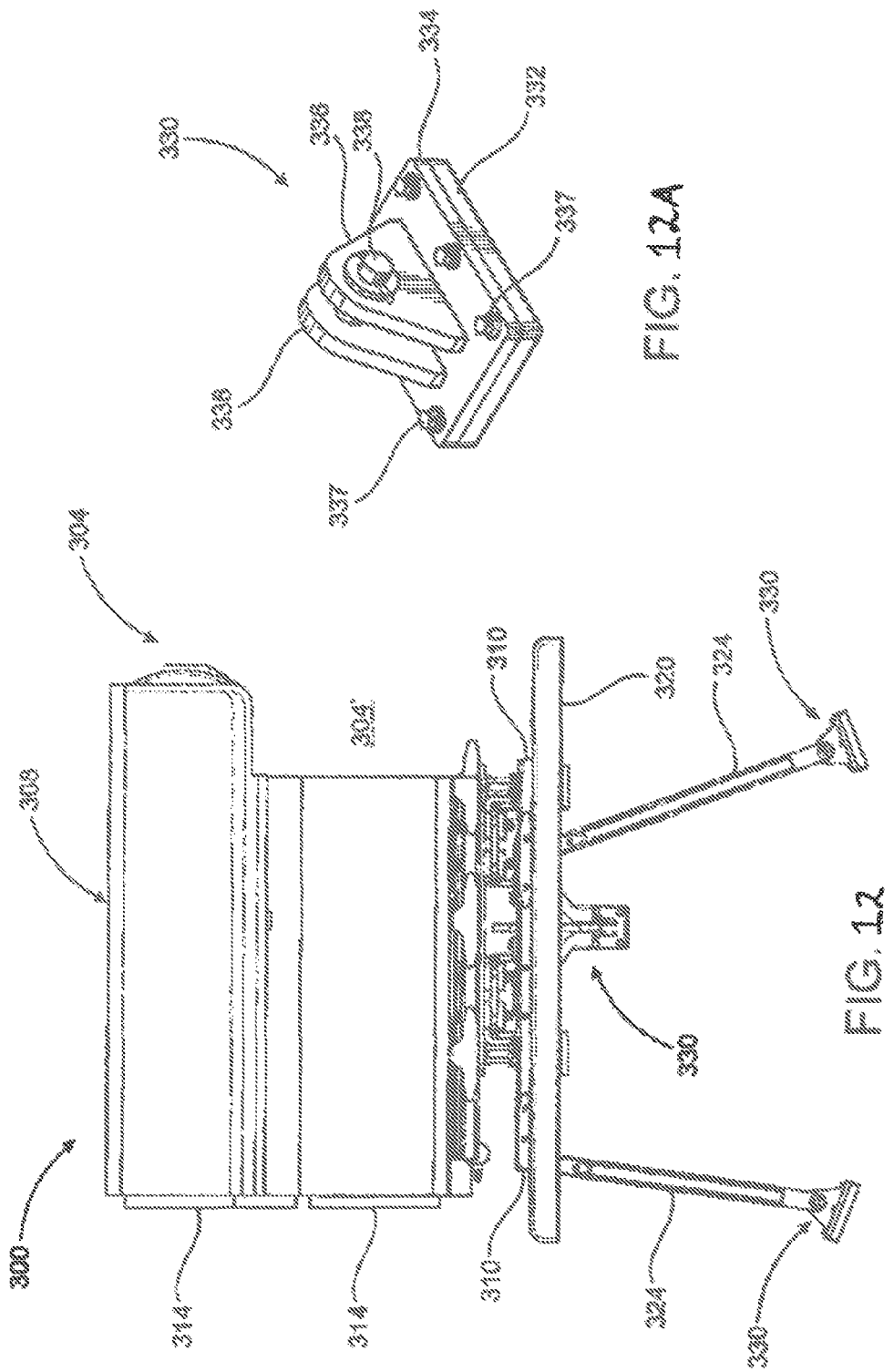
FIG. 12 is a front view in partial phantom of the preferred embodiment of the FIGS. 10 and 11.
Figure 13:
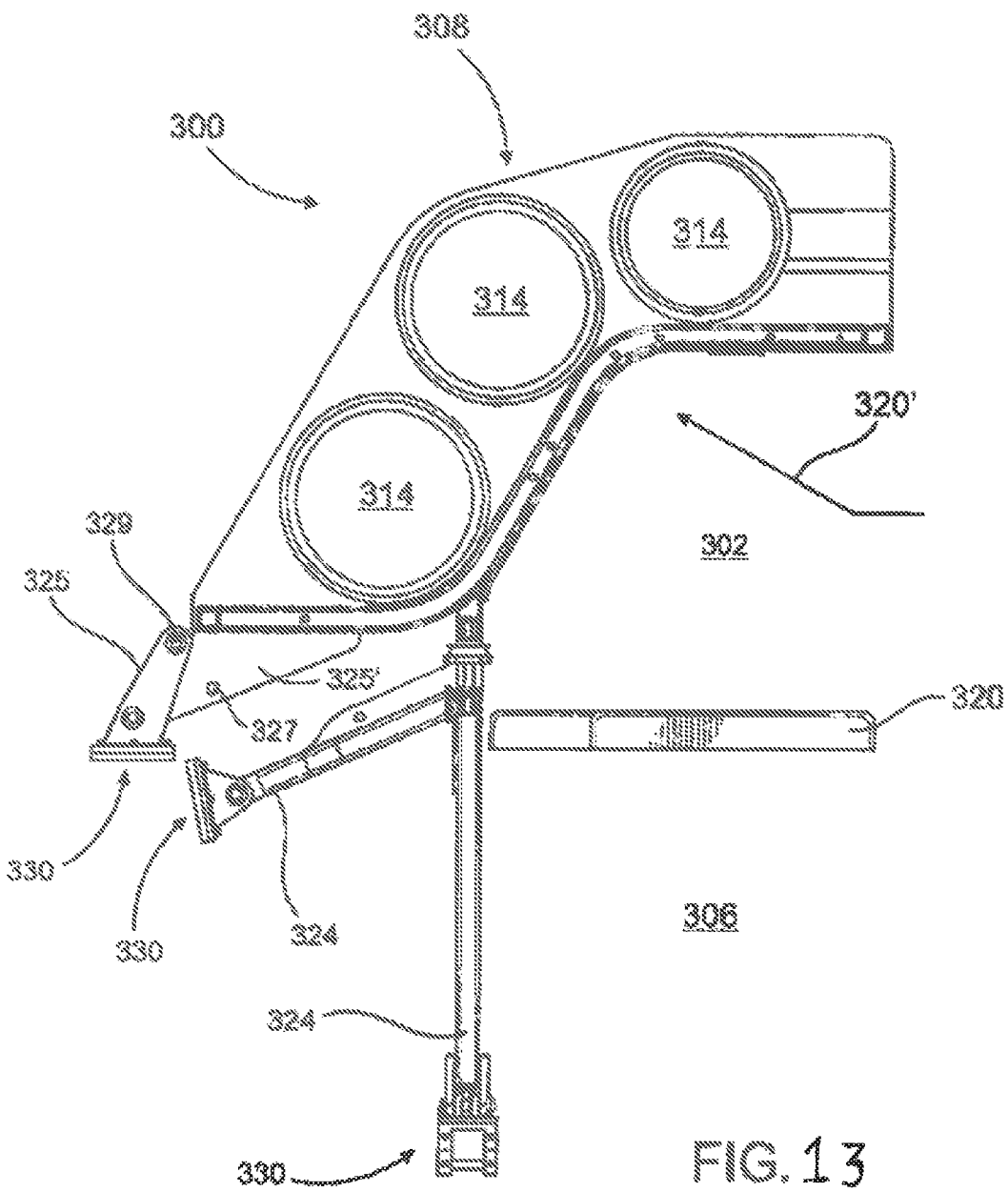
FIG. 13 is a side view in partial phantom of the preferred embodiment of FIG. 10.
Figure 14:
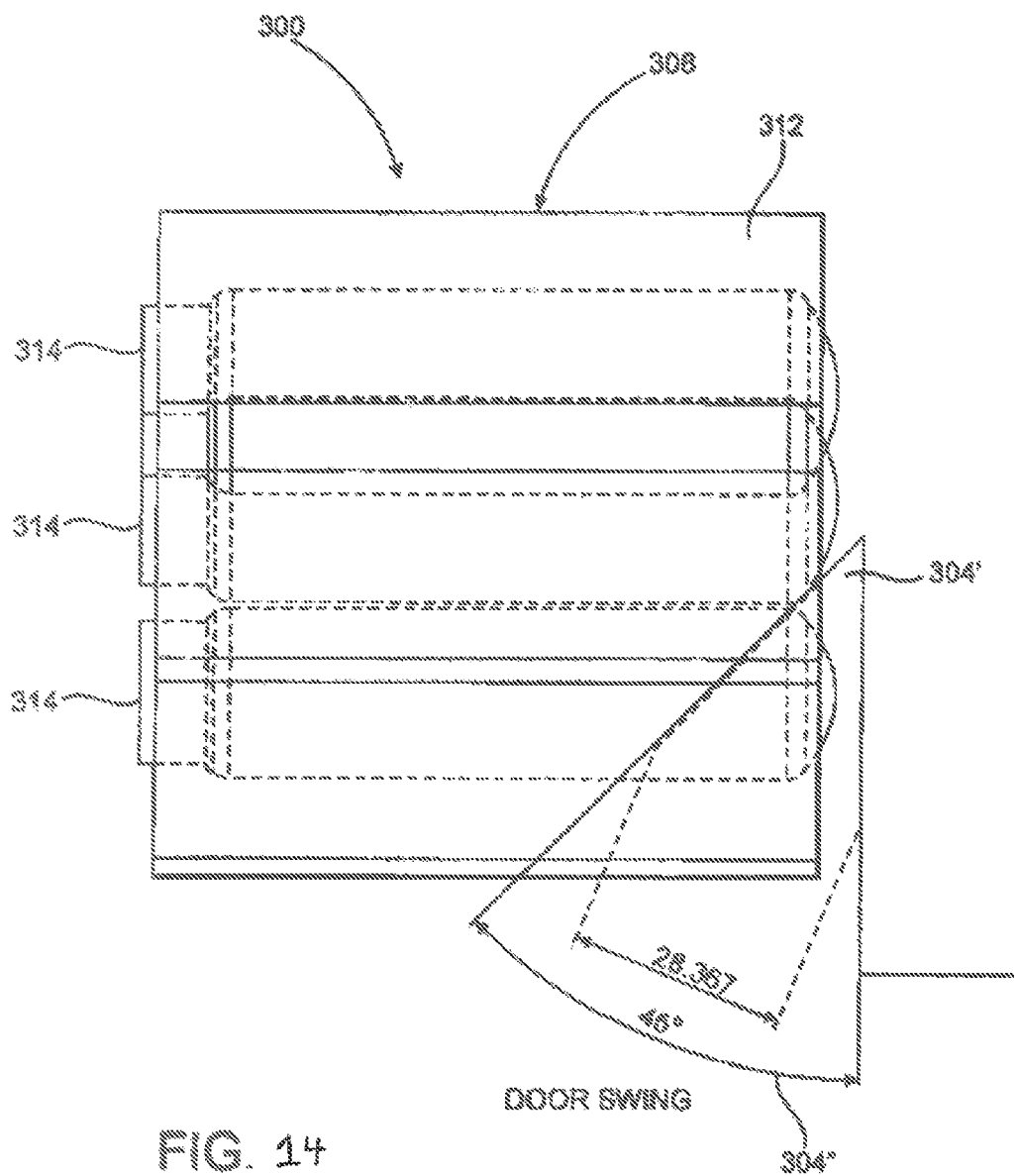
FIG. 14 is a top, schematic view in partial phantom of the embodiment of FIG. 10.

As will be explained in greater detail herein after, the dimension, configuration and disposition of the housing 308 is disposed immediately adjacent and possibly in at least partial interruptive relation to an entrance 304' of the operator cab 304. The housing 308 is also disposed in overlying, at least partially covering relation to an access structure 320 overlying and at least partially enclosing a portion of the engine compartment 306. However, cooperative structuring of the mounting assembly 300, specifically including the housing 308, is such as to allow at least a minimal operative opening of the operator cab access 304' as well as operative opening of an access structure 320 as clearly represented in FIGS. 13 and 14 respectively. As will be explained in greater detail hereinafter, with specific but not exclusive reference to FIGS. 15 and 16, the housing 308 is selectively disposable between the first orientation as represented in FIGS. 10 through 15 and a second orientation as represented in FIG. 16. Moreover, the aforementioned conformance of the mounting assembly 300 as well as the containment area 302 to the particular mine haul vehicle 400 with which it is intended for use, allows the operative opening for both the operator cab entrance 304' and the access structure 320 while the housing 308 is in the first orientation. As schematically represented in FIG. 12, the operative opening of the operator cab entrance 304' may be defined by an opening thereof of at least 45 degree "door swing" from its closed position as represented in FIG. 10 to its operative opened position as represented in FIG. 14. Similarly, with reference to FIG. 13, the access structure 320 is disposed in overlying, at least partially covering relation to the engine compartment 306. Accordingly when access is required to the engine compartment 306, the access structure 320 is operatively opened.

Another feature of the present invention is the base 316 disposed in supporting relation to the housing 308, as well as defining an interconnection between the housing 308 and correspondingly disposed stable portions of the vehicle 400. More specifically, the base 316 includes a plurality of support members 324 and 325. The disposition, dimension and configuration of the plurality of support members 324 and 325 are such as to connect and support the housing 308 in the containment area 302 in a stable manner, while leaving a majority or at least a sufficient portion of the containment area 302 in an uncluttered state. The base 316 includes at least some or a first set 324 of the plurality of support members having an elongated configuration. Also, the support members 324 are removably connected or anchored at least partially within the engine compartment 306.

Similarly, the plurality of support members 325 are disposed and configured to maintain and support an interconnection of the housing 308, while further facilitating the positioning of the housing 308 between the aforementioned first orientation, as represented in FIGS. 10-15, and a second orientation as represented in FIG. 16. The plurality of support members 325 may include a shorter structure than support members 324 and also include a hinge assembly or structure, generally indicated as 325'. Further, a first set of the plurality of support members 324 as well as the second set or plurality of support members 325 are both securely anchored at least partially within the interior of the engine compartment 306 utilizing a plurality of mounts 330 represented in FIG. 12A. Each of the plurality of mounts 330 have an anchor portion 332 welded or otherwise fixedly secured to an appropriately stable frame or brace portion on the interior of the engine compartment 306. A connecting platform or like structure 334 is bolted or otherwise fixedly secured to the anchor portion 332 and includes one or more brackets 336 affixed thereto. Further, the brackets 336 are cooperatively disposed and structured to receive and support a pin member 338 which provides a stable interconnection but possibly at least some movement of the distal ends 324' to their corresponding mounts 330. The second set or plurality of support members 325 may have a somewhat different construction, such that one or more upstanding brackets or bracket pairs as at 336' include a different arrangement of a pin as at 338' which serves as a pivot point for the remainder of the hinge section or portion 325'. Also the hinge portion 325' includes a locking aperture or like structure 327 designed to be aligned with a through aperture or channel 329 for purposes of locking the hinge structure 325' in a position facilitating the support and interconnection of the housing 308 relative to the vehicle 400, when in the second orientation as demonstrated in FIG. 16.

Figure 15:
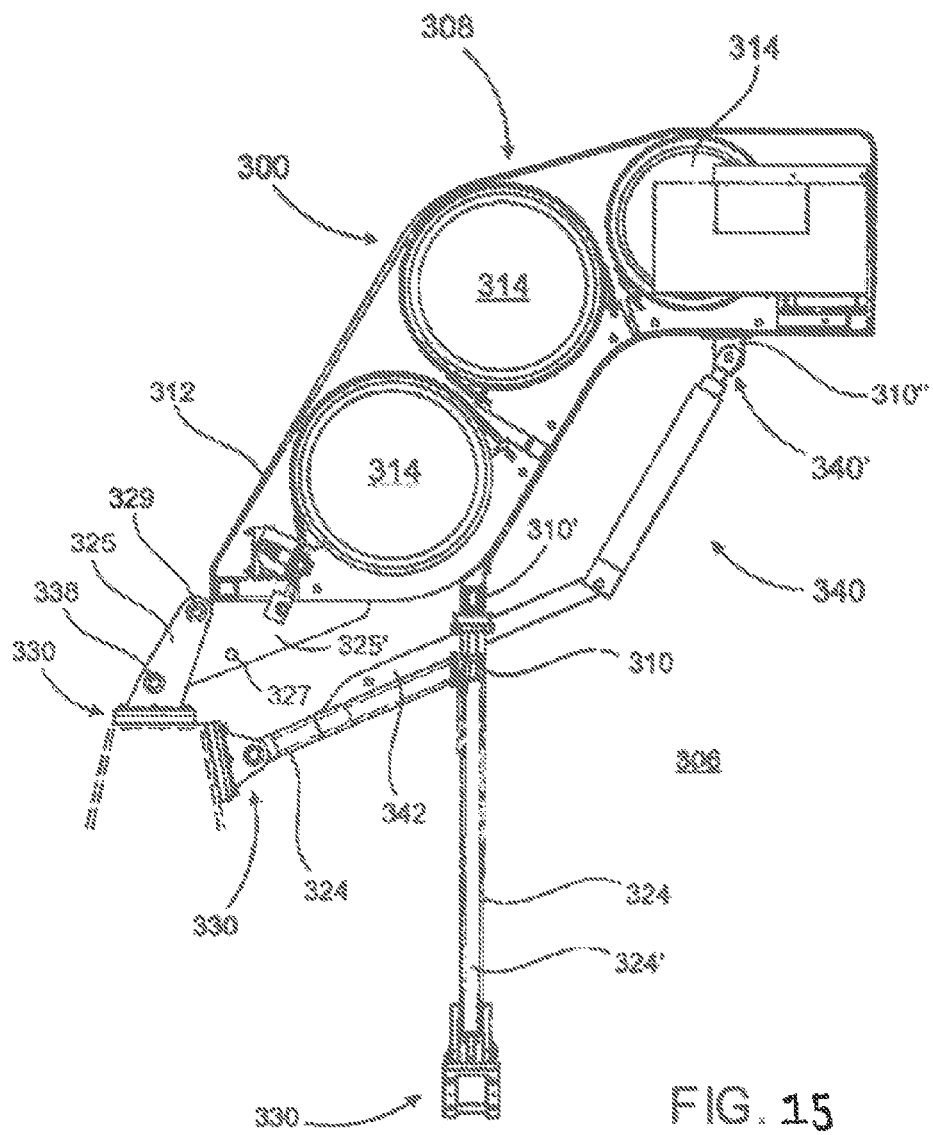
FIG. 15 is a side view of the embodiment of FIGS. 10-14 in a first orientation with a positioning assembly operatively secured thereto.
Figure 16:
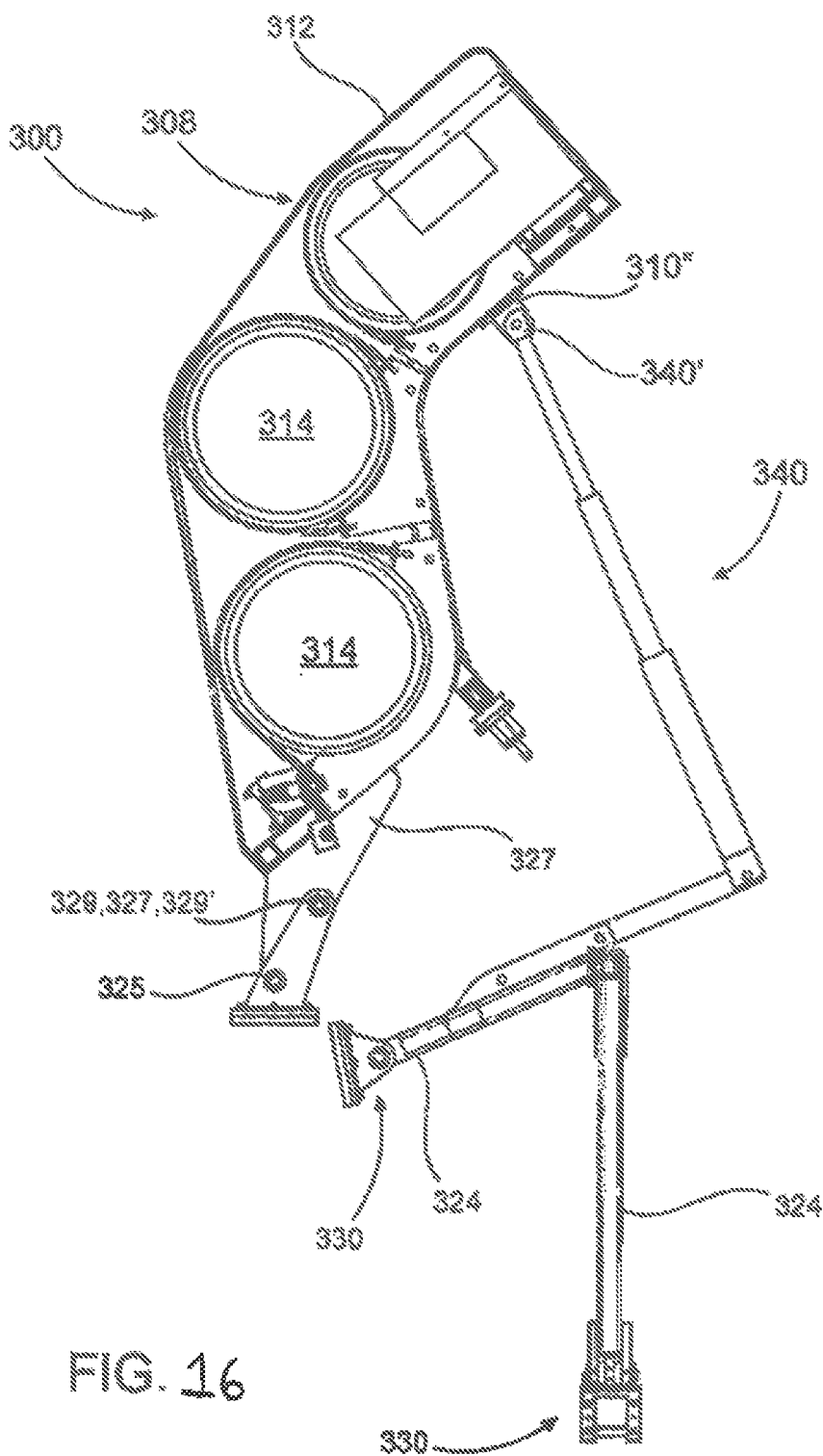
FIG. 16 is a side view of the embodiment of FIGS. 10-15 in a second orientation with the positioning assembly operatively disposed in a different position from that of FIG. 15.

As set forth above and with primary reference to FIGS. 15 and 16, the housing 308 of the mounting assembly 300 is selectively disposed between the first orientation as represented in FIG. 15 and a second orientation as represented in FIG. 16. Accomplishing movement or repositioning of the housing 308 includes the use of a positioning assembly tool generally indicated in as 340. The positioning assembly tool 340 preferably comprises a fluid activated piston and cylinder assembly including a telescopic connection of the various components selectively disposable between a retracted position of FIG. 15 and an outwardly extended position of FIG. 16. Such activation of the positioning assembly or tool 340 is accomplished by connecting it to an appropriate fluid source such as, but not limited to, a fluid source of hydraulic or pneumatic fluid. When so connected and when appropriately activated, the positioning assembly tool 340 will be disposed between and into the retracted position of FIG. 15 or the extended position of FIG. 16.

Moreover, cooperative structuring of at least a portion of the frame 310 with the base and or a plurality of support members 324 further facilitates the disposition of the housing 308 between the first and second orientations. More specifically, the frame 310' is detachable from all or at least some of the plurality of support members 324, while remaining movably attached to the plurality of support members 325. In operation, the positioning assembly tool 340 is connected to a brace segment 342 fixedly or integrally secured to at least some of the plurality of support members 324. The outer or distal end 324, of the first set of support members 324 is connected to a corresponding portion of the frame 310". Accordingly, upon detachment of the frame portion 310" from corresponding ones of the support members 324 and a concurrent or subsequent activation of the positioning assembly tool 340, the housing 308 will be raised or otherwise disposed between the first orientation of FIG. 15 and the second orientation of FIG. 16, for example by pivoting about the hinge structure 325. Once in the second orientation, the hinge structure 325 will remain connected to the frame 310 and effectively locked or fixed into the supporting orientation represented in FIG. 16 by an appropriate locking pin passing through apertures 327 and 327' as set forth above. Due to the fixed or locking position of the hinge member 325, the positioning assembly tool 340 may be removed from its interconnecting relation between the frame portions 310" and the brace segment 342 so as to provide clear access to the containment area 302, engine compartment 306, operator cab 304 and entrance 304' adjacent or other areas, as required.

Figure 17:
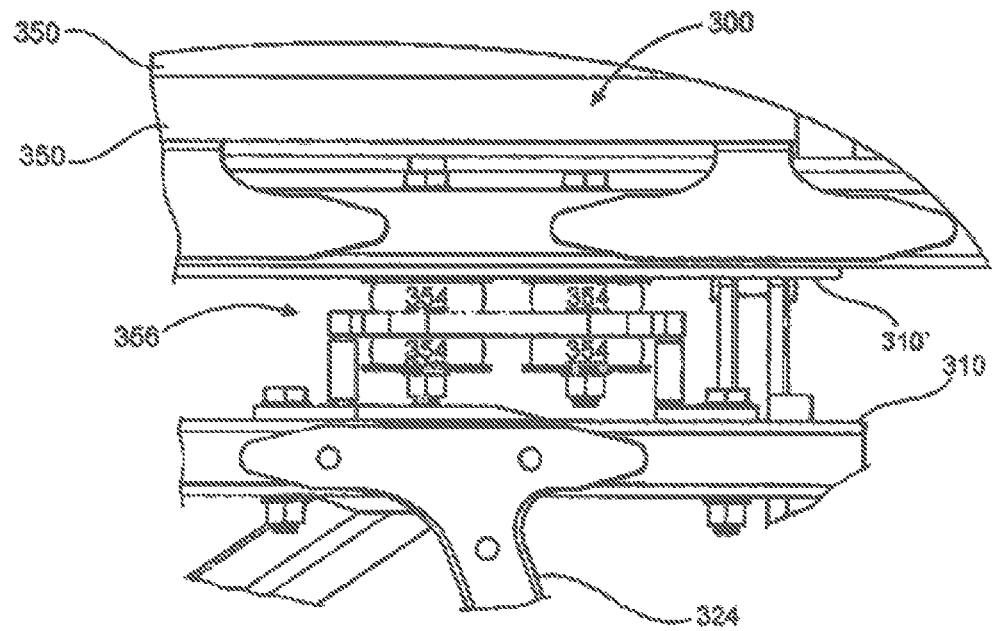
FIG. 17 is a front plan view in partial cutaway of interconnecting portions of a base and housing of the mounting assembly and a shock absorbing assembly associated therewith.
Figure 17A:
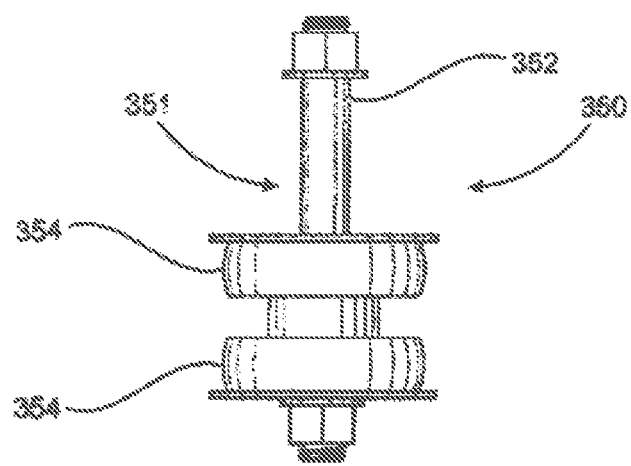
FIG. 17A is a detail view of an isolation mount associated with the embodiment of FIG. 17.

As should be apparent, during normal operation of the vehicle 400 whether idling or in an operative, traveling state, a certain amount of vibration will exist throughout the vehicle as well as the frame thereof. Accordingly, another structural and operative feature of the present invention is represented in FIGS. 17 and 17A and includes a shock absorber assembly generally indicated as 350. The shock absorber assembly 350 is preferably in the form of isolation mounts 351 including a connecting stem 352 and shock absorbing or vibration attenuating segments 354. Accordingly, the plurality of mounts 351 are appropriately interconnected between the frame 310 or the housing 308 and a connecting structure 356 associated with the frame or other corresponding portion of the base 316 to which at least some of the plurality of support members 324 are connected.

Further with regards to the mine haul vehicle 400, Caterpillar Model 793, one feature associated therewith is disposition and structuring of the mounting assembly 300 and its cooperative disposition and structure with the mine haul vehicle 400 to facilitate re-fueling of the alternate fuel supply, including the one or more tanks 314 from a ground level of the mine haul vehicle 400. Accordingly, a fuel supply 360 may be appropriately positioned on or adjacent the ground level of the mine haul vehicle 400 and include appropriate conduits or connecting hoses, etc. facilitating the transfer of the alternate fuel (LNG) from the fuel supply 360 to the one or more tanks 314.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An assembly for mounting a fuel supply on a vehicle, said assembly comprising:
a mounting assembly, said mounting assembly including a housing and a base;
said base disposed on the vehicle and structured to support said mounting assembly on the vehicle,
said housing movably connected to said base and selectively disposable between a first orientation and a second orientation relative to said base and the vehicle;
a containment structure disposed in an interior of said housing and structured to move with said housing between said first and second orientations;
said base structured to support said housing and said containment structure in both said first and second orientations, and
a canopy disposed in at least partially protective relation to said containment structure.

2. An assembly as recited in claim 1 wherein said canopy comprises at least one shield plate formed from a rigid, heavy duty, impact resistant material.

3. An assembly as recited in claim 2 wherein said at least one shield plate is configured to at least partially correspond to said housing and is disposed in at least partially surrounding relation thereto.

4. An assembly for mounting a fuel supply on a vehicle, said assembly comprising: a containment structure, a base connected in supporting relation to said containment structure, said base comprising a first number of support members detachably supporting said containment structure; said base further comprising a second number of support members movably supporting said containment structure in pivoting relation thereto, said base movably supporting said containment structure between a first and a second orientation, relative to said base, and a positioning assembly removably disposable in coupling relation between said first number of support members and said containment structure; said positioning assembly operative to dispose said containment structure between said first and second orientations.

5. An assembly as recited in claim 4 wherein said second number of support members comprise hinge structures.

6. An assembly as recited in claim 4 further comprising a shock absorber assembly disposed between said containment structure and said base; said shock absorber assembly structured to restrict transmission of vibration to said containment structure from the vehicle.

7. An assembly as recited in claim 6 wherein said shock absorber assembly comprises a plurality of isolation mounts disposed between said base and said containment structure.

8. An assembly as recited in claim 4 further comprising a housing at least partially enclosing said containment structure.

9. An assembly for mounting a fuel supply on a vehicle, said assembly comprising:
 a mounting assembly, said mounting assembly including a housing and a base;
 said base disposed on the vehicle and structured to support said housing on the vehicle,
 said housing movably connected to said base and selectively disposable between a first orientation and a second orientation relative to said base and the vehicle;
 a containment structure disposed in an interior of said housing and structured to move with said housing between said first and second orientations;
 said base structured to support said housing and said containment structure in both said first and second orientations, and
 a stabilizing assembly disposed within said housing in confronting relation to said containment structure; said stabilizing assembly disposed and structured to restrict movement of said containment structure within said housing.

10. An assembly as recited in claim 9 further comprising a plurality of fuel tanks defining said containment structure; said stabilizing assembly disposed and configured to at least partially surround and contain each fuel tank of said plurality of fuel tanks.

11. An assembly as recited in claim 9 wherein said positioning assembly comprises a fluid activated piston and cylinder assembly disposable in interconnecting relation between said base and said housing.

12. An assembly as recited in claim 11 wherein said base includes a plurality of hinge structures movably interconnecting said housing to the vehicle and collectively structured to pivotally dispose said housing into and out of said first and second orientations, said plurality of hinge structures disposed to collectively support said housing at least when in said second orientation.

13. An assembly for mounting a fuel supply on a vehicle, said assembly comprising:
 a mounting assembly, said mounting assembly including a housing and a base;
 said base disposed on the vehicle and structured to support said housing on the vehicle,
 said housing movably connected to said base and selectively disposable between a first orientation and a second orientation relative to said base and the vehicle;
 a containment structure disposed in an interior of said housing and structured to move with said housing between said first and second orientations;
 said base structured to support said housing and said containment structure in both said first and second orientations, and
 a positioning assembly disposable in interconnecting relation between said base and said housing; said positioning assembly operative to dispose said housing between said first and second orientations.

14. An assembly as recited in claim 13 wherein said positioning assembly comprises a fluid activated piston and cylinder assembly; said positioning assembly operative to pivot said containment structure about said second number of support members upon activation of said fluid activated piston and cylinder assembly.

* * * * *